United States Patent
Chaudhuri et al.

(10) Patent No.: US 6,542,886 B1
(45) Date of Patent: Apr. 1, 2003

(54) SAMPLING OVER JOINS FOR DATABASE SYSTEMS

(75) Inventors: Surajit Chaudhuri, Redmond, WA (US); Rajeev Motwani, Palo Alto, CA (US); Vivek Narasayya, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/268,275

(22) Filed: Mar. 15, 1999

(51) Int. Cl.$^7$ .............................................. G06F 17/30

(52) U.S. Cl. .............................................. 707/2; 707/7

(58) Field of Search ................................ 707/6, 2, 103, 707/5, 538, 520, 1, 3, 4, 7, 8, 9, 10, 100, 101, 102

(56) References Cited

U.S. PATENT DOCUMENTS

| | | | | |
|---|---|---|---|---|
| 5,442,778 A | * | 8/1995 | Pedersen et al. | 395/600 |
| 5,701,460 A | | 12/1997 | Kaplan et al. | 707/3 |
| 6,012,064 A | * | 1/2000 | Gibbons et al. | 707/103 |
| 6,035,295 A | * | 3/2000 | Klein | 707/6 |
| 6,278,989 B1 | * | 8/2001 | Chaudhuri et al. | 707/2 |
| 6,295,533 B2 | * | 9/2001 | Cohen | 707/5 |

OTHER PUBLICATIONS

Olken, Frank, et al., "Random Sampling from Databases—A Survey," Informaton and Computing Sciences Div., Lawrence Berkeley Laboratory, Berkeley, California, pp. 1–55 (Mar. 1994).*

Chaudhuri, Surajit, et al., "Random Sampling for Histogram Construction: How Much is Enough?" *Proceedings of ACM SIGMOD*, Seattle, Washington, pp. 436–447 (Jun. 1–4, 1998).

Denning, Dorothy E., "Secure Statistical Databases with Random Sample Queries," *ACM Transactions on Database Systems*, vol. 5, No. 3, pp. 291–315 (Sep. 1980).

Ganguly, Sumit, et al., "Bifocal Sampling for Skew–Resistant Join Size Estimation," *Proceedings of the ACM SIGMOD International Conference on Management of Data*, Montréal, Québec, Canada, pp. 271–281 (Jun. 4–6, 1996).

Gibbons, Phillip B., et al., "Fast Incremental Maintenance of Approximate Histograms," *Proceedings of the 23rd International Conference on Very Large Data Bases (VLDB)*, Athens, Greece, pp. 466–475 (Aug. 26–29, 1997).

Haas, Peter J., et al., "Sequential Sampling Procedures for Query Size Estimation," *Proceedings of the ACM SIGMOD International Conference on Management of Data*, San Diego, California, pp. 341–350 (Jun. 2–5, 1992).

Haas, Peter J., et al., "On the Relative Cost of Sampling for Join Selectivity Estimation," *Proceedings of the ACM SIGACT–SIGMOD–SIGART Symposium on Principles of Database Systems*, Minneapolis, Minnesota, pp. 14–24 (1994).

(List continued on next page.)

*Primary Examiner*—Hosain T. Alam
*Assistant Examiner*—Tam Nguyen
(74) *Attorney, Agent, or Firm*—Watts, Hoffmann, Fisher & Heinke, Co., LPA

(57) ABSTRACT

A database server supports weighted and unweighted sampling of records or tuples in accordance with desired sampling semantics such as with replacement (WR), without replacement (WoR), or independent coin flips (CF) semantics, for example. The database server may perform such sampling sequentially not only to sample non-materialized records such as those produced as a stream by a pipeline in a query tree for example, but also to sample records, whether materialized or not, in a single pass. The database server also supports sampling over a join of two relations of records or tuples without requiring the computation of the full join and without requiring the materialization of both relations and/or indexes on the join attribute values of both relations.

43 Claims, 11 Drawing Sheets

OTHER PUBLICATIONS

Haas, Peter J., et al., "Sampling–Based Selectivity Estimation for Joins Using Augmented Frequent Value Statistics," *Proceedings of the IEEE Conference on Data Engineering*, pp. 522–531 (1995).

Haas, Peter J., et al., "Sampling–Based Estimation of the Number of Distinct Values of an Attribute," *Proceedings of the 21st International Conference on Very Large Data Bases (VLDB)*, Zurich, Switzerland, pp. 311–322 (1995).

Hellerstein, Joseph M., et al., "Online Aggregation," *Proceedings of the ACM SIGMOD Conference*, pp. 171–182 (1997).

Hou, Wen–Chi, et al., "Statistical Estimators for Relational Algebra Expressions," *Proceedings of the 7th ACM Symposium on Principles of Database Systems*, pp. 276–287 (1988).

Hou, Wen–Chi, et al., "Processing Aggregate Relational Queries with Hard Time Constraints," *Proceedings of the ACM SIGMOD International Conference on Management of Data*, Portland, Oregon, pp. 68–77 (1989).

Hou, Wen–Chi, et al., "Error–Constrained COUNT Query Evaluation in Relational Databases," *Proceedings of the ACM SIGMOD International Conference on Management of Data*, Denver, Colorado, pp. 278–287 (May 29–31, 1991).

Ling, Yibei, et al., "An Evaluation of Sampling–Based Size Estimation Methods for Selections in Database Systems," *Proceedings of the Eleventh IEEE International Conference on Data Engineering*, Taipei, Taiwan, pp. 532–539 (Mar. 6–10, 1995).

Lipton, Richard J., et al., "Query Size Estimation by Adaptive Sampling," *Proceedings of the Ninth ACM SIGACT–SIGMOD–SIGART Symposium on Principles of Database Systems*, Nashville, Tennessee, pp. 40–46 (Apr. 2–4, 1990).

Lipton, Richard J., et al., "Practical Selectivity Estimation through Adaptive Sampling," *Proceedings of the ACM SIGMOND International Conference on Management of Data*, Atlantic City, New Jersey, pp. 1–11 (May 23–25, 1990).

Lipton, Richard J., et al., "Efficient Sampling Strategies for Relational Database Operations," *Theoretical Computer Science*, vol. 116, Elsevier Science Publishers, pp. 195–226 (1993).

Motwani, Rajeev, et al., *Randomized Algorithms*, Cambridge University Press, pp. v–viii (1995).

Naughton, Jeffrey F., et al., "On Estimating the Size of Projections," *Proceedings of the Third International Conference on Database Theory (ICDT)*, Paris, France, pp. 499–513 (Dec. 12–14, 1990).

Olken, Frank, et al., "Simple Random Sampling from Relational Databases," *Proceedings of the Twelfth International Conference on Very Large Data Bases (VLDB)*, Kyoto, pp. 160–169 (Aug. 1986).

Olken, Frank, "Random Sampling from Databases," PhD Dissertation, University of California at Berkeley, Abstract, pp. iii–xii and 1–158 (1993).

Olken, Frank, et al., "Random Sampling from Databases—A Survey," Information and Computing Sciences Div., Lawrence Berkeley Laboratory, Berkeley, California, pp. 1–55 (March 1994).

Ozsoyoglu, G., et al., "On Estimating Count, Sum and Average Relational Algebra Queries," *Proceedings of the International Conference on Database and Expert Systems Applications*, Berlin, Federal Republic of Germany, pp. 406–412 (1991).

Piatetsky–Shapiro, Gregory, et al., "Accurate Estimation of the Number of Tuples Satisfying a Condition," *Proceedings of the ACM SIGMOD International Conference on Management of Data*, pp. 256–276 (1984).

Vitter, Jeffrey S., "Faster Methods for Random Sampling," *Communications of the ACM*, vol. 27, No. 7, pp. 703–718 (Jul. 1984).

Vitter, Jeffrey S., "Random Sampling with a Reservoir," *ACM Transactions on Mathematical Software*, vol. 11, No. 1, pp. 37–57 (Mar. 1985).

Vitter, Jeffrey S., "An Efficient Algorithm for Sequential Random Sampling," *ACM Transactions on Mathematical Software*, vol. 13, No. 1, pp. 58–67 (Mar. 1987).

Zipf, George Kingsley, *Human Behavior and the Principle of Least Effort*, Addison–Wesley Press, Inc., p. xi (1949).

* cited by examiner

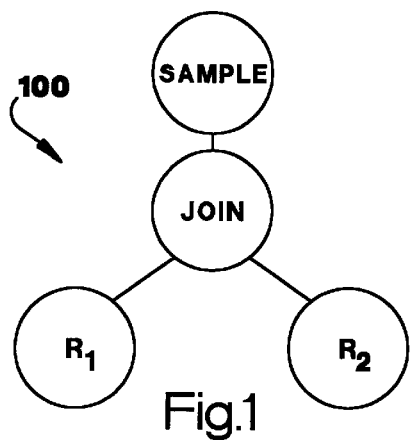
Fig.1
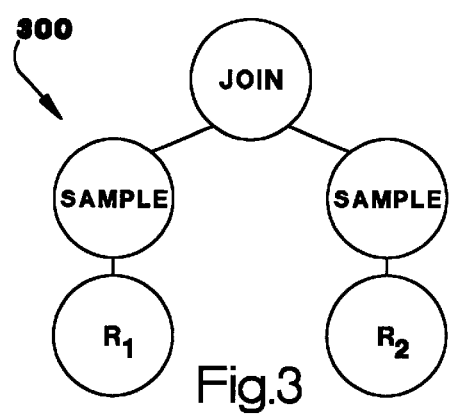
Fig.3
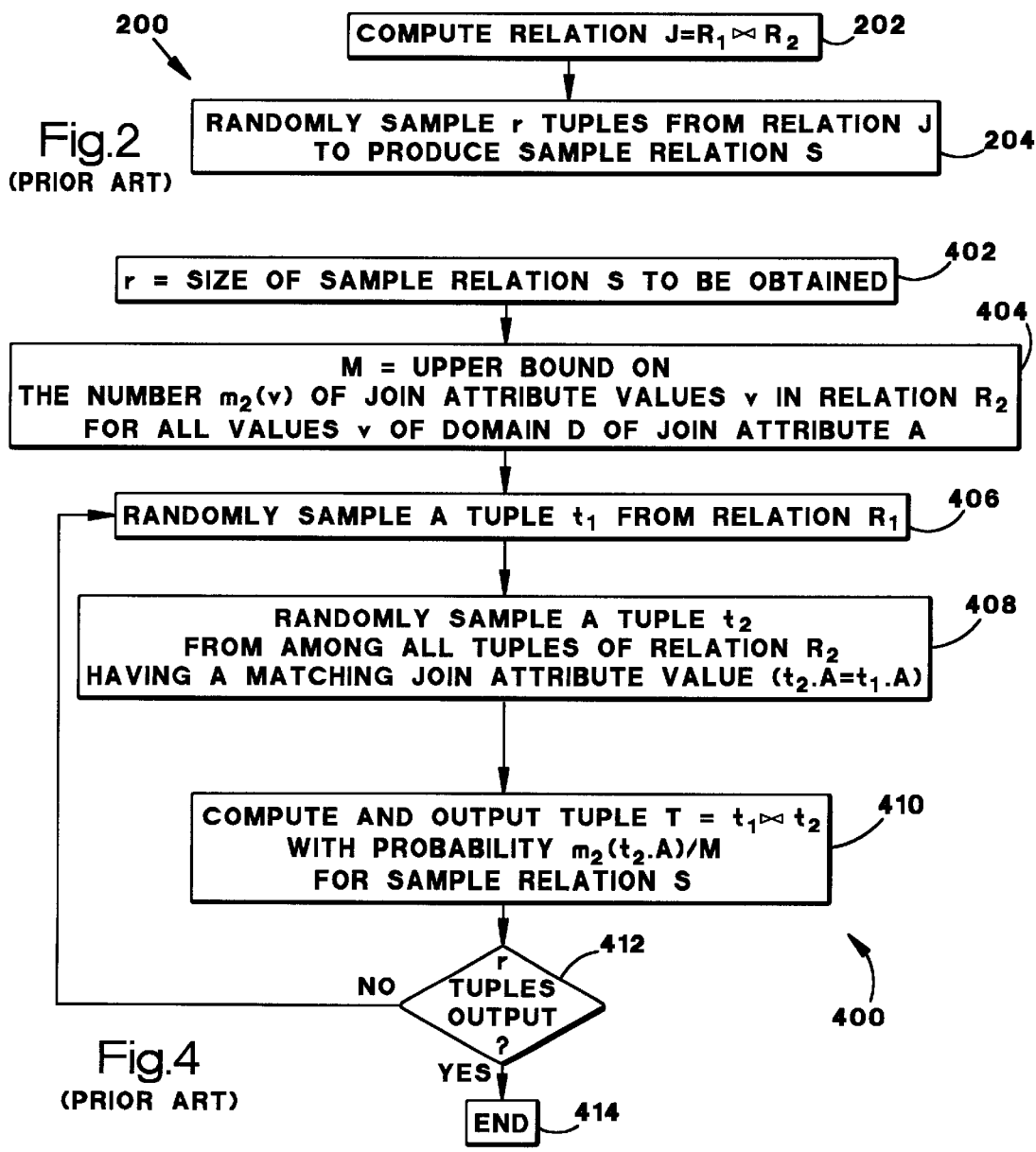
Fig.2 (PRIOR ART)
Fig.4 (PRIOR ART)

SAMPLING OVER JOINS FOR DATABASE SYSTEMS

TECHNICAL FIELD

The present invention relates generally to the field of database systems. More particularly, the present invention relates to the field of sampling records in a database system.

BACKGROUND OF THE INVENTION

Computer database systems manage the storage and retrieval of data in a database. A database comprises a set of tables of data along with information about relations between the tables. Tables represent relations over the data. Each table comprises a set of records or tuples of data stored in one or more data fields. The records of a table are also referred to as rows, and the data fields of records in a table are also referred to as columns. A database server processes data manipulation statements or queries, for example, to retrieve, insert, delete, and update data in a database. Queries are defined by a query language supported by the database system.

For large databases such as data warehouses, for example, typical tools such as On Line Analytical Processing (OLAP) and data mining serve as middleware or application servers that communicate data retrieval requests to a backend database system through a query. Although the cost of executing ad-hoc queries against the backend can be expensive, many data mining applications and statistical analysis techniques can use a sample of the data requested through the query. Similarly, OLAP servers that answer queries involving aggregation (e.g., "find total sales for all products in the NorthWest region between Jan. 1, 1998 and Jan. 15, 1998") benefit from the ability to present to the user an approximate answer computed from a sample of the result of the query posed to the database.

Sampling is preferably supported not only on existing stored or base relations but also on relations produced as a result of an arbitrary query. Samping may be supported in relational databases as a primitive operation SAMPLE(R,f), for example, to produce a sample S of r tuples that is an f-fraction of a relation R. Fully evaluating a query Q to compute relation R only to discard most of relation R when applying SAMPLE(R,f), however, is inefficient. Preferably, query Q may be partially evaluated so as to produce only sample S of relation R.

For a given query tree T for computing a relation R that is the result of a query Q where SAMPLE(R,F) is the root or last operation of query tree T, pushing the sample operation down tree T toward its leaves would help minimize the cost of evaluating query Q as only a small fraction of stored and/or intermediate relations would be considered in evaluating query Q. The ability to commute the sample operation in this manner, however, depends on the relational operations used in query tree T. The standard relational operation of selection can be freely interchanged with sampling. With join operations, however, sampling may not be so easily commuted.

FIG. 1 illustrates a query tree 100 for obtaining a sample of a join of operand relations $R_1$ and $R_2$. Query tree 100 is executed in accordance with a flow diagram 200 of FIG. 2. For step 202 of FIG. 2, a relation J is computed by joining $R_1$ and $R_2$, or $J=R_1 \infty R_2$. For step 204, r tuples are randomly sampled from relation J to produce a sample relation S. Commuting the sample operation in query tree 100 to operand relations $R_1$ and $R_2$, as illustrated by a query tree 300 in FIG. 3, would minimize the cost of obtaining a join sample because only samples of operand relations $R_1$ and $R_2$ would need to be joined. A join of samples of operand relations $R_1$ and $R_2$, however, will not likely give a random sample of the join of operand relations $R_1$ and $R_2$.

As one example:

$$R_1(A,B)=\{(a_1,b_0), (a_2,b_1), (a_2,b_2), (a_2,b_3), \ldots, (a_2,b_n)\}$$

and $$R_2(A,C)=\{(a_2,c_0), (a_1,c_1), (a_1,c_2), (a_1,c_3), \ldots, (a_1,c_n)\}.$$

That is, relation $R_1$ is defined over attributes A and B. Among the n+1 tuples of relation $R_1$, one tuple has an A-value $a_1$ and n tuples have an A-value $a_2$, but all n+1 tuples of relation $R_1$ have distinct B-values. Similarly, relation $R_2$ is defined over attributes A and C. Among the n+1 tuples of relation $R_2$, n tuples have an A-value $a_1$ and one tuple has an A-value $a_2$, but all n+1 tuples of relation $R_2$ have distinct C-values.

Computing the equi-join of relations $R_1$ and $R_2$ over attribute A produces the following relation:

$$J=R_1\infty R_2=\{(a_1,b_0,c_1), (a_1,b_0,c_2), (a_1,b_0,c_3), \ldots, (a_1,b_0,c_n), (a_2,b_1,c_0), (a_2,b_2,c_0), (a_2,b_3,c_0), \ldots, (a_2,b_n,c_0)\}.$$

That is, relation J has n tuples with A-value $a_1$ and n tuples with A-value $a_2$.

About one half of the tuples in a random sample S of relation J, or $S \subset J$, would likely have an A-value of $a_1$ while the remaining tuples would have an A-value of $a_2$. A random sample $S_1$ of relation $R_1$, or $S_1 \subset R_1$, however, would not likely comprise tuple $(a_1,b_0)$, and a random sample $S_2$ of relation $R_2$, or $S_2 \subset R_2$, would not likely comprise tuple $(a_2,c_0)$. The join of samples $S_1$ and $S_2$ would then likely comprise no tuples and therefore would not likely give random sample S of relation J.

One prior sampling strategy for obtaining a sample S of a join of two relations $R_1$ and $R_2$ with respect to a join attribute A is illustrated as a flow diagram 400 in FIG. 4.

For notational purposes, relations $R_1$ and $R_2$ have sizes $n_1$ and $n_2$, respectively. The domain of join attribute A is denoted by D. For each value v of domain D, or $v \in D$, $m_1(v)$ and $m_2(v)$ denote the number of distinct tuples in relations $R_1$ and $R_2$, respectively, that contain value v in attribute A. Then, $\Sigma_{v \in D} m_1(v)=n_1$ and $\Sigma_{v \in D} m_2(v)=n_2$. A relation J results from the computation of the join of relations $R_1$ and $R_2$, or $J=R_1 \infty R_2$, and n is the size of relation J, or $n=|J|=|R_1 \infty R_2|$. Then, $n=\Sigma_{v \in D} m_1(v)m_2(v)$. For each tuple t of relation $R_1$, the set of tuples in relation $R_2$ that join with tuple t is denoted as $J_t(R_2)=\{t' \in R_2 | t'.A=t.A\}$; $t \infty R_2$ denotes the set of tuples in $R_1 \infty R_2$ obtained by joining tuple t with the tuples in $J_t(R_2)$; and $|t \infty R_2|=|J_t(R_2)|=m_2(t.A)$. Similarly for each tuple t of relation $R_2$, $J_t(R_1)=\{t' \infty R_1 | t'.A=t.A\}$; $R_1 \infty t$ denotes the set of tuples in $R_1 \infty R_2$ obtained by joining tuples in $J_t(R_1)$ with tuple t; and $|R_1 \infty t|=|J_t(R_1)|=m_1(t.A)$.

For step 402 of FIG. 4, a variable r is initialized to the size of a sample relation S to be obtained from the join of relations $R_1$ and $R_2$. For step 404, a variable M is initialized to the upper bound on the number of join attribute values v in relation $R_2$ for all values v of domain D on attribute A. That is, M is the maximum number of any one join attribute value in relation $R_2$. A tuple $t_1$ is randomly sampled from relation $R_1$ for step 406. A tuple $t_2$ is then randomly sampled for step 408 from among all tuples of relation $R_2$ having a join attribute value $t_2.A$ that matches the join attribute value $t_1.A$ of tuple-$t_1$. For step 410, a tuple T is computed as $T=t_1 \infty t_2$ and output for sample relation S with a probability based on the number of tuples in relation $R_2$ having a join attribute value that matches that of tuple $t_1$ divided by M, or $m_2(t_2.A)/M$. If not output, the sample tuple $t_1$ is rejected for step 410. If r tuples have not yet been output for sample relation S as determined for step 412, steps 406 through steps 412 are then repeated until r tuples have been output to form sample relation S as determined for step 412. Flow diagram 400 then ends for step 414.

The sampling technique of FIG. 4 in practice, however, requires indexes for random access to relations $R_1$ and $R_2$, noting relation $R_1$ must be materialized for proper sampling because the rejection of tuples for step 410 requires that the number of samples from relation $R_1$ be a random variable- .having a distribution dependent upon the distribution of join attribute values in relation $R_2$. This strategy therefore has limited applicability in commuting sampling with joins involving intermediate relations that are produced as a result of an arbitrary query in a query tree and that are not materialized and indexed.

The ability to sample tuples produced as a stream, that is to perform sequential sampling, is significant not only because intermediate relations produced by a pipeline, such as in a query tree for example, may be sampled without materialization but also because a relation, whether materialized or not, may be sampled in a single pass. How and whether sequential sampling may be performed, however, may depend on the chosen semantics for the sampling.

The tuples of a relation may be sampled, for example, using with replacement (WR), without replacement (WoR), or independent coin flips (CF) semantics.

For WR sampling of an f-fraction of the n tuples in a relation R, each sampled tuple is chosen uniformly and independently from among all tuples in relation R, noting any one tuple could be sampled multiple times. The sample is a bag or multiset of f*n tuples from relation R.

For WoR sampling an f-fraction of the n tuples in a relation R, f*n distinct tuples are sampled from relation R, noting each successive sampled tuple is chosen uniformly from the set of tuples not yet sampled. The sample is a set of f*n distinct tuples from relation R.

For CF sampling an f-fraction of the n tuples in a relation R, each tuple in relation R is chosen for the sample with probability f, independent of other tuples. Sampling in this manner is analogous to flipping a coin with bias f for each tuple in turn. The sample is a set of X distinct tuples from relation R, where X is a random variable with the binomial distribution B(n,f) and has expectation f*n. The binomial distribution B(n,f) is, in effect, the distribution of a random value generated by counting the total number of heads when flipping n independent coins, each of which has a probability f of being heads. Sampling using independent coin flip semantics is also called binomial sampling.

The sampling of a relation may also be weighted or unweighted. For unweighted sampling, each element is sampled uniformly at random. For weighted sampling, each element is sampled with a probability proportional to its weight for some pre-specified set of weights.

One prior sequential sampling technique uses CF semantics by sampling each passing tuple of a relation R with probability f for heads and adds the tuple to a sample S if the probability is satisfied. Another prior sequential sampling technique uses WoR semantics by initializing a list or reservoir of r tuples with the first r tuples of relation R and repeatedly removing random tuples from the list while adding tuples from relation R to the end of the list to produce a sample S. Each of these techniques do not require the size of relation R in advance and may therefore be used for sampling relations that are not materialized. Each of these techniques also preserve sortedness by producing a sample of tuples in the same relative order as in relation R. The reservoir sampling technique, however, does not produce a sequential output of tuples as no tuples are output until the technique has terminated. In the case of scanning a materialized relation on a disk, however, the reservoir sampling technique may be efficient by reading only those tuples to be entered in the reservoir by generating random intervals of tuples to be skipped.

SUMMARY OF THE INVENTION

A join sample operator for obtaining a sample of a join of first and second relations of records in a database system has the first and second relations as parameters. The join sample operator may also have a size of the sample as a parameter and/or sampling semantics as a parameter. The sampling semantics may be with replacement, without replacement, or coin flip sampling semantics.

A method obtains a sample of a join in a database system. The method may be implemented by computer-executable instructions of a computer readable medium.

For the method, first and second relations of records are identified from parameters of a join sample operator, and a sample of a join of the identified first and second relations is obtained. A size of the sample to be obtained may also be identified from a parameter of the join sample operator, and the sample of the join of the identified first and second relations may be obtained based on the identified sample size. Sampling semantics may be identified from a parameter of the join sample operator, and the sample of the join of the identified first and second relations may be obtained in accordance with the identified sampling semantics. The identified sampling semantics may be with replacement, without replacement, or coin flip sampling semantics.

The sample of the join of the first and second relations may be obtained by sampling records of the first relation based on join attribute values of the second relation to obtain a first sample of records and joining one or more records of the first sample with one or more records of the second relation. The sample of the join of the first and second relations may also be obtained by sampling records of the first relation having a matching join attribute value with at least a predetermined number of records in the second relation to obtain a first sample of records, joining the records of the first sample with the records of the second relation, joining records of the first relation having a matching join attribute value with less than the predetermined number of records in the second relation with the records of the second relation, and obtaining the sample of the join of the first and second relations from the joined records of the first sample and second relation and from a sample of the other joined records.

Another method obtains a sample of a join of first and second relations of records in a database system. The method may be implemented by computer-executable instructions of a computer readable medium. The database system may perform the method with suitable means.

For the method, records of the first relation are sampled based on join attribute values of the second relation to obtain a first sample of records, and one or more records of the first sample are joined with one or more records of the second relation.

Records of the first relation may be sampled based on the number of records having a matching join attribute value in the second relation and/or based on a weight specified for each record of the first relation based on the number of records having a matching join attribute value in the second relation. Frequency statistics on join attribute values of the second relation may be used to sample records of the first relation.

The first relation may be produced as a stream of records as a result of a query or may be a base relation materialized in a database of the database system. Records of the first relation may be sampled using a with replacement, without replacement, or coin flip sampling technique and/or may be sampled in one pass using a sequential sampling technique.

Records of the first relation may be sampled by selectively outputting a record of the first relation one or more times based on a probability and repeating this step for each record of the first relation. Records of the first relation may also be sampled by initializing a reservoir of records, selectively resetting one or more records of the reservoir to be a record of the first relation based on a probability, repeating this just prior step for each record of the first relation.

One or more records of the first sample may be joined with one or more records of the second relation by sampling a record from the second relation having a matching join attribute value with an identified record of the first sample and joining the identified record of the first sample with the sampled record of the second relation. These steps may be repeated for each record of the first sample.

One or more records of the first sample may also be joined with one or more records of the second relation by joining the records of the first sample with the records of the second relation to produce a relation having groups of records with each group corresponding to a respective one of the records of the first sample. One record from each group may then be sampled.

One or more records of the first sample may also be joined with one or more records of the second relation by sampling records from the second relation to obtain a second sample of records such that the number of records in the first sample with any one join attribute value is the same as that in the second sample and joining the records of the first sample with the records of the second sample. The records of the first sample may be joined with the records of the second sample by sampling a record without replacement from the first sample having a matching join attribute value with an identified record of the second sample, joining the sampled record of the first sample with the identified record of the second sample, and repeating these steps for each record of the second sample.

Records of the first relation having a matching join attribute value with at least a predetermined number of records in the second relation may be sampled to form the first sample, and the records of the first sample may be joined with the records of the second relation. Records of the first relation having a matching join attribute value with less than the predetermined number of records in the second relation may be joined with the records of the second relation. The sample of the join of the first and second relations maybe obtained from the joined records of the first sample and second relation with a probability based on the number of records that would result from joining the records of the first relation having a matching join attribute value with at least the predetermined number of records in the second relation with the records of the second relation and from a sample of the other joined records with a probability based on the number of records that would result from joining the records of the first relation having a matching join attribute value with less than the predetermined number of records in the second relation with the records of the second relation.

BRIEF DESCRIPTION OF THE DRAWINGS

The present invention is illustrated by way of example and not limitation in the figures of the accompanying drawings, in which like references indicate similar elements and in which:

FIG. 1 illustrates a join query tree with a sample root operation;

FIG. 2 illustrates one prior art flow diagram for obtaining a sample over a join operation;

FIG. 3 illustrates a join query tree with the sample operation commuted to the operand relations of the join operation;

FIG. 4 illustrates another prior art flow diagram for obtaining a sample over a join operation;

DETAILED DESCRIPTION OF THE INVENTION

A database server supports weighted and unweighted sampling of records or tuples in accordance with desired sampling semantics such as with replacement (WR), without replacement (WoR), or independent coin flips (CF) semantics, for example. The database server may perform such sampling sequentially not only to sample non-materialized records, such as those produced as a stream by a pipeline in a query tree for example, but also to sample records, whether materialized or not, in a single pass. The database server also supports sampling over a join of two relations of records or tuples without requiring the computation of the full join and without requiring the materialization of both relations and/or indexes on the join attribute values of both relations.

Exemplary Operating Environment

Figure 5:
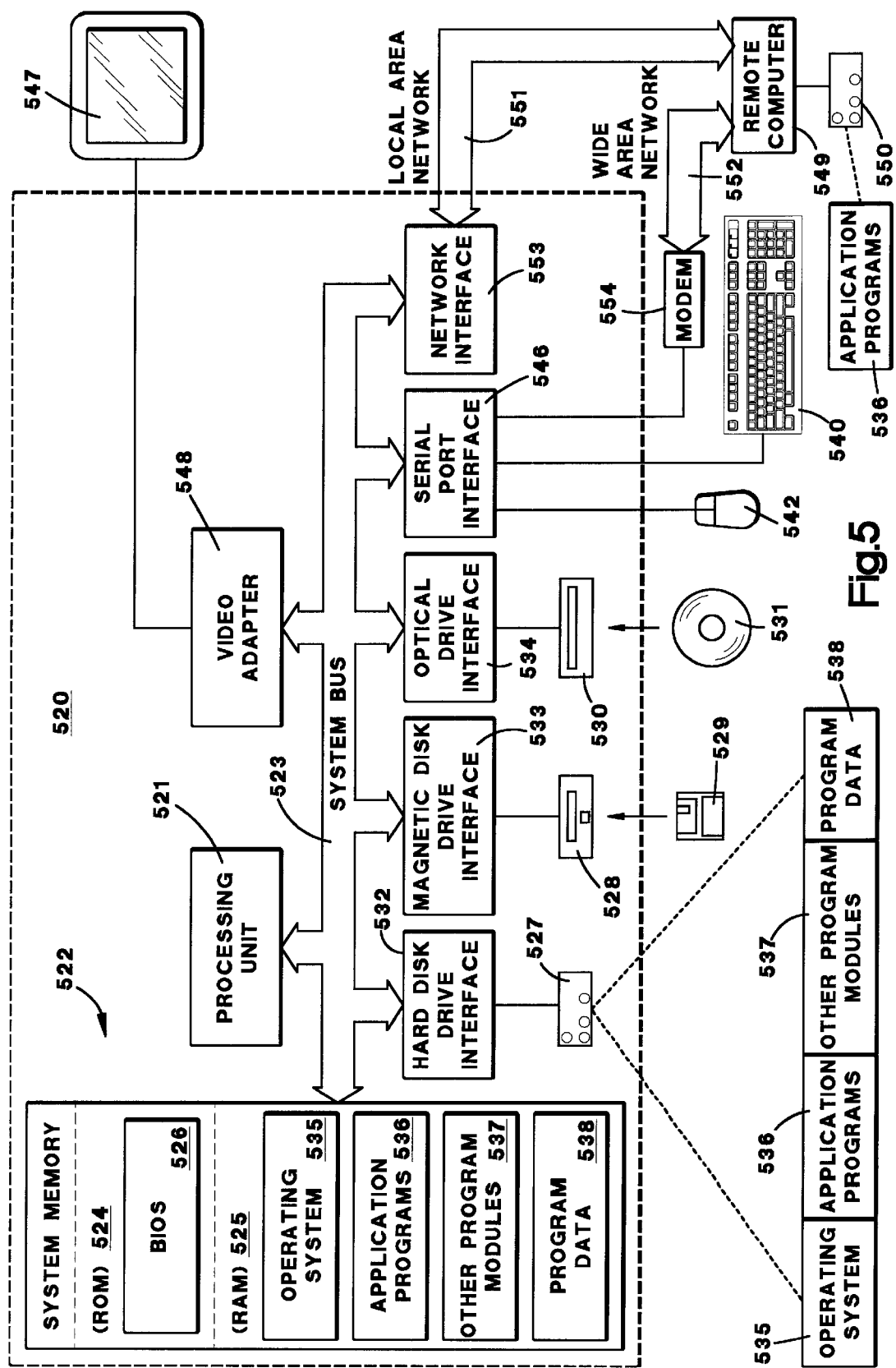
FIG. 5 illustrates an exemplary operating environment for sampling of records and sampling over join operations.

FIG. 5 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing the invention includes a general purpose computing device in the form of a conventional personal computer 520, including a processing unit 521, a system memory 522, and a system bus 523 that couples various system components including system memory 522 to processing unit 521. System bus 523 may be any of several types of bus structures including a memory bus or memory controller, a peripheral bus, and a local bus using any of a variety of bus architectures. System memory 522 includes read only memory (ROM) 524 and random access memory (RAM) 525. A basic input/output system (BIOS) 526, containing the basic routines that help to transfer information between elements within personal computer 520, such as during start-up, is stored in ROM 524. Personal computer 520 further includes a hard disk drive 527 for reading from and writing to a hard disk, a magnetic disk drive 528 for reading from or writing to a removable magnetic disk 529, and an optical disk drive 530 for reading from or writing to a removable optical disk 531 such as a CD ROM or other optical media. Hard disk drive 527, magnetic disk drive 528, and optical disk drive 530 are connected to system bus 523 by a hard disk drive interface 532, a magnetic disk drive interface 533, and an optical drive interface 534, respectively. The drives and their associated computer-readable media provide nonvolatile storage of computer-readable instructions, data structures, program modules and other data for personal computer 520. Although the exemplary environment described herein employs a hard disk, a removable magnetic disk 529 and a removable optical disk 531, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 529, optical disk 531, ROM 524 or RAM 525, including an operating system 535, one or more application programs 536, other program modules 537, and program data 538. A user may enter commands and information into personal computer 520 through input devices such as a keyboard 540 and pointing device 542. Other input devices may include a microphone, joystick, game pad, satellite dish, scanner, or the like. These and other input devices are often connected to processing unit 521 through a serial port interface 546 that is coupled to system bus 523, but may be connected by other interfaces, such as a parallel port, game port or a universal serial bus (USB). A monitor 547 or other type of display device is also connected to system bus 523 via an interface, such as a video adapter 548. In addition to the monitor, personal computers typically include other peripheral output devices, such as speakers and printers.

Personal computer 520 may operate in a networked environment using logical connections to one or more remote computers, such as a remote computer 549. Remote computer 549 may be another personal computer, a server, a router, a network PC, a peer device or other common network node, and typically includes many or all of the elements described above relative to personal computer 520, although only a memory storage device 550 has been illustrated in FIG. 5. The logical connections depicted in FIG. 5 include a local area network (LAN) 551 and a wide area network (WAN) 552. Such networking environments are commonplace in offices, enterprise-wide computer networks, intranets and the Internet.

When used in a LAN networking environment, personal computer 520 is connected to local network 551 through a network interface or adapter 553. When used in a WAN networking environment, personal computer 520 typically includes a modem 554 or other means for establishing communications over wide area network 552, such as the Internet. Modem 554, which may be internal or external, is connected to system bus 523 via serial port interface 546. In a networked environment, program modules depicted relative to personal computer 520, or portions thereof, may be stored in remote memory storage device 550. It will be appreciated that the network connections shown are exemplary and other means of establishing a communications link between the computers may be used.

Database System

Figure 6:
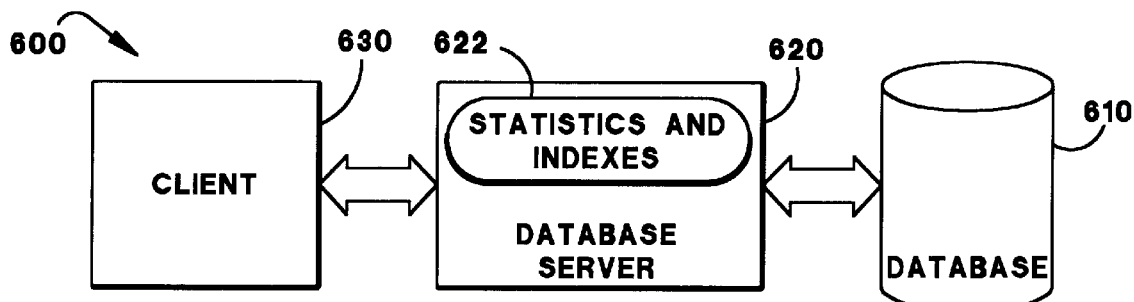
FIG. 6 illustrates an exemplary database system for sampling of records and sampling over join operations.

FIG. 6 illustrates one example of a computer database system 600 for performing sampling of records and sampling over join operations. Database system 600 comprises a database 610, a database server 620, and a client tool 630. Database system 600 manages the storage and retrieval of data in database 610 in accordance with data manipulation statements or queries presented to database server, 620 by client tool 630, for example. Client tool 630 may be, for example, a database application, a user interface tool, On Line Analytical Processing (OLAP) or data mining middleware, or an OLAP or data mining application server.

Database 610 comprises a set of tables of data along with information about relations between the tables. Tables represent relations over the data. Each table comprises a set of records or tuples of data stored in one or more data fields. The records of a table are also referred to as rows, and the data fields of records in a table are also referred to as columns.

Database server 620 processes queries, for example, to retrieve, insert, delete, and/or update data in database 610 Database system 600 may support any suitable query language, such as Structured Query Language (SQL) for example, to define the queries that may be processed by database server 620. Suitable SQL queries include, for example, Select, Insert, Delete, and Update statements. Database server 620 for one embodiment comprises the Microsoft® SQL Server.

To enhance performance in processing queries, database server 620 uses indexes to help access data in database 610 more efficiently. Database server 620 also generates efficient execution plans for queries with respect to a set of indexes. In generating execution plans, database server 620 may use statistics such as histograms on the column(s) of the tables referenced in a query. Database server 620 may store such indexes and statistics in a catalog table 622, for example.

Because the cost of executing ad-hoc queries against database 610 can be expensive, for example if database 610 is a large database such as a data warehouse, database server 620 may sample not only existing base relations stored in database 610 but also relations produced as a result of an arbitrary query. Database server 620 may, for example, sample intermediate relations produced as a result of a query in a query tree.

Database server 620 supports weighted and unweighted sampling of records or tuples in accordance with desired sampling semantics such as with replacement (WR), without replacement (WoR), or independent coin flips (CF) semantics, for example. Database server 620 may perform such sampling sequentially not only to sample non-materialized records, such as those produced as a stream by a pipeline in a query tree for example, but also to sample records, whether materialized or not, in a single pass. Database server 620 also supports sampling over a join of two relations $R_1$ and $R_2$ without requiring the computation of the full join $J=R_1 \infty R_2$ and without requiring the materialization of both relations $R_1$ and $R_2$ and/or indexes on the join attribute values of both relations $R_1$ and $R_2$.

Database server 620 and client tool 630 are implemented for one example as program modules or computer-executable instructions and may be stored on any suitable computer-readable medium for execution in a suitable operating environment, such as the computing environment of FIG. 5 for example. The data of database 610 and catalog table 622 may be implemented in the form of one or more suitable data structures and may also be stored on any suitable computer-readable medium.

Sample Operator

Database server 620 supports a sample operator that may be inserted into a query execution plan or tree to obtain a weighted or unweighted sample S from a relation R using designated sampling semantics.

The sample operator may have as parameters a relation R from which a sample S is to be obtained, the size of sample S, the sampling semantics to be used in obtaining sample S, and a weight function. One exemplary sample operator is SAMPLE(relation R, sample size, semantics, weight function). The sample size, sampling semantics, and/or weight function parameters may optionally be set or predetermined by the sampling technique performed by database server 620 in performing the sample operator.

The sample size parameter may be expressed as a number r of tuples to be obtained from relation R for sample S or as a fraction f of the n tuples of relation R to be obtained for sample S. Whether the number r or fraction f is to be designated may depend on the sampling technique performed by database server 620 in performing the sample operator. Where the number n of tuples of relation R is known or may be determined, however, database server 620 may determine the fraction f for a designated number r and may also determine the number r for a designated fraction f.

The sampling semantics parameter may identify any suitable sampling semantics such as, for example, with replacement (WR), without replacement (WoR), or independent coin flips (CF) semantics.

The weight function parameter may designate unweighted sampling, for example by specifying the same weight, such as one for example, for each tuple t of relation R, or may designate weighted sampling by specifying how each tuple t of relation R is to be weighted.

Database server 620 may perform any suitable sampling technique in performing the sample operator. For sampling of materialized relations, database server 620 may perform any suitable non-sequential sampling technique, including any suitable known unweighted non-sequential sampling technique. Database server 620 may also perform any suitable sequential sampling technique, including any suitable known unweighted sequential WoR or CF sampling technique, not only to sample non-materialized relations, such as those produced by a pipeline in a query tree for example, but also to sample any relation, whether materialized or not, in a single pass.

Unweighted Sequential WR Sampling

To obtain an unweighted with replacement (WR) sample S of an f-fraction or r tuples from a relation R of n tuples, for example in performing a sample operator such as SAMPLE(R, r, WR, w(t)) where w(t) returns a constant for each tuple t of relation R for unweighted sampling, database server 620 uniformly and independently chooses each tuple of sample S at random from relation R.

Database server 620 may perform unweighted sequential WR sampling in one pass by obtaining a tuple t from relation R, selectively outputting one or more copies of tuple t based on a probability, and repeating this technique for other tuples of relation R to form sample S. As one example, database server 620 may perform unweighted sequential WR sampling in accordance with a flow diagram 700 of FIG. 7.

Figure 7:
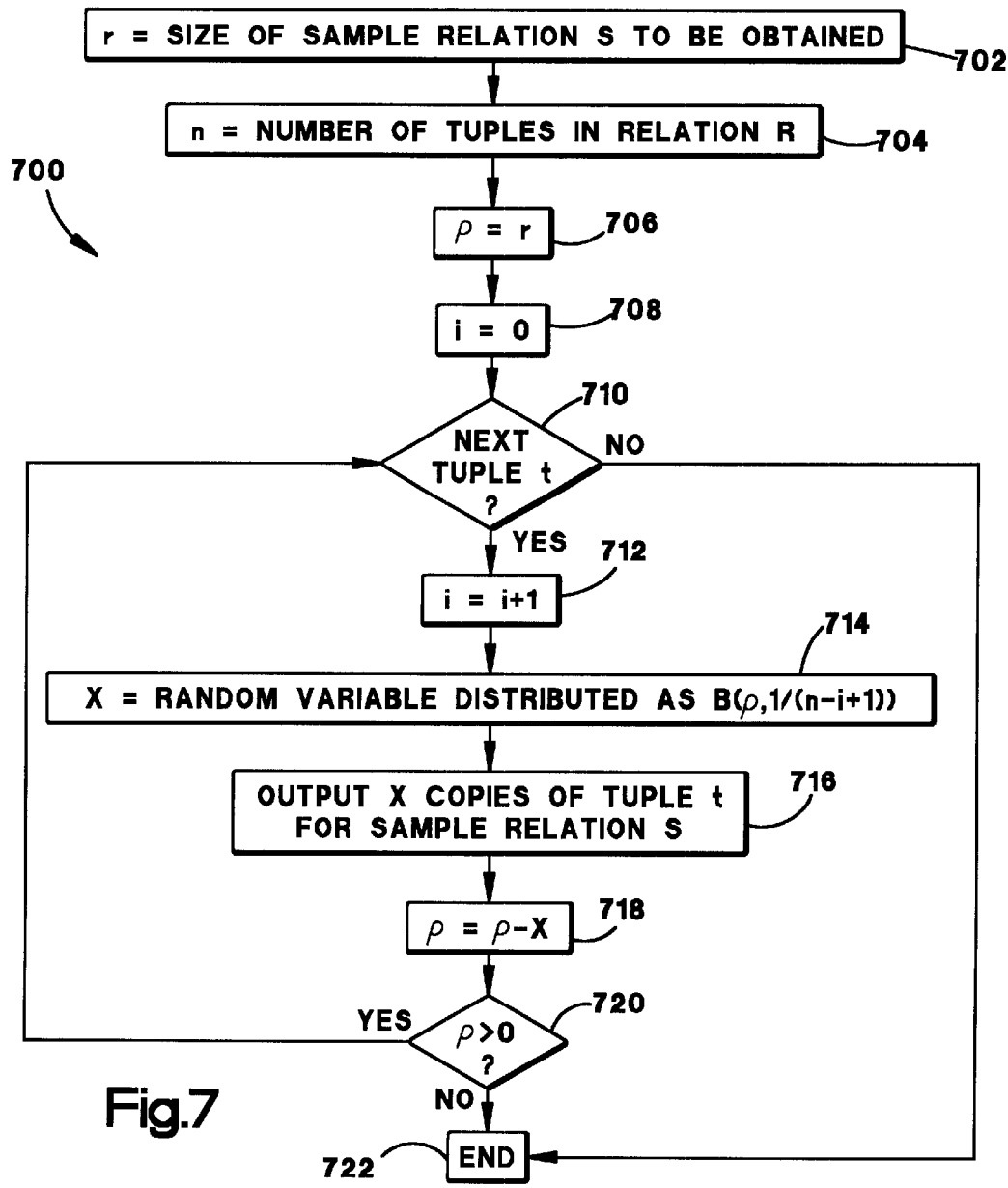
FIG. 7 illustrates a flow diagram for one example of an unweighted sequential with replacement (WR) sampling technique.

For step 702 of FIG. 7, a variable r is initialized to the size of sample relation S to be obtained from relation R. A variable n is initialized to the number of tuples in relation R for step 704. For step 706, the variable $\rho$ is initialized to r. The variable $\rho$ maintains a count of the number of tuples remaining to be output for sample S. For step 708, a variable i is initialized to zero. The variable i maintains a count of the number of tuples that have been obtained from relation R for evaluation.

Each tuple of relation R is evaluated for steps 710, 712, 714, 716, 718, and 720 to determine whether any and, if so, how many copies of that tuple are to be output for sample S.

For step 710, a next tuple t in relation R is obtained for evaluation, and the variable i is incremented by one for step 712. For step 714, a random variable X distributed as a binomial distribution is determined. An exemplary binomial distribution has as parameters the number $\rho$ of tuples yet to be obtained for sample S and probability based on the number of tuples from relation R that have yet to be evaluated, such as $B(\rho, 1/(n-i+1))$ for example. Noting the random variable X is an integer greater than or equal to zero and less than or equal to $\rho$, X copies of tuple t are output for sample S for step 716. Although illustrated as being distributed in accordance with binomial distribution $B(\rho, 1/(n-i+1))$ for random sampling, the variable X may be determined in accordance with any suitable probability, such as for biased sampling for example. The number $\rho$ of tuples yet to be obtained for sample S is accordingly reduced by X for step 718 and compared to zero for step 720.

If ρ is greater than zero for step 720, steps 710–720 are repeated until all tuples of relation R have been evaluated as determined for step 710 or until the number ρ of tuples yet to be obtained for sample S has been reduced to zero as determined for step 720. Flow diagram 700 then ends for step 722.

Sampling tuples in this manner advantageously produces the r tuples of sample S in the same relative order as in relation R and uses minimal auxiliary memory as only one tuple of relation R is stored at a time.

Although flow diagram 700 of FIG. 7 requires the size n of relation R, relation R may be materialized in which case the size of the relation may be already known or determined. Relation R may have also been produced as a sample of another relation in which case the size of relation R may have been specified for relation R or determined in producing relation R. The size n of relation R may optionally be designated as a parameter for a sample operator.

The sampling technique of FIG. 7 may be used for block-level sampling of a relation materialized on a disk, for example, and may be used to skip over a random set of tuples, that is those tuples for which the random variable X is zero.

Database server 620 may also perform unweighted sequential WR sampling in one pass by obtaining a tuple t from relation R, selectively resetting one or more tuples of a reservoir to be tuple t based on a probability, and repeating this technique for other tuples of relation R to form sample S. As one example, database server 620 may perform unweighted sequential WR sampling in accordance with a flow diagram 800 of FIG. 8.

Figure 8:
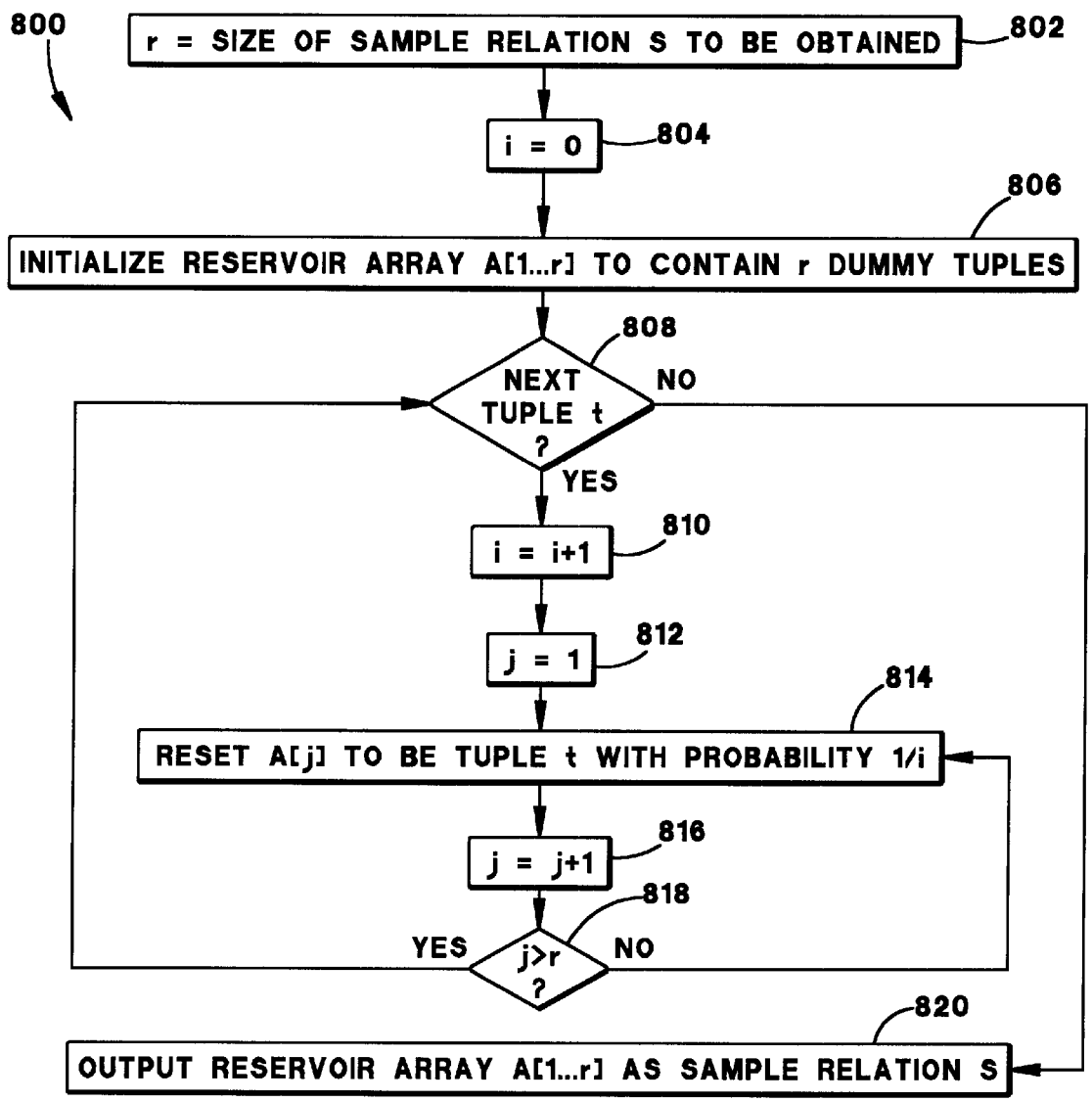
FIG. 8 illustrates a flow diagram for another example of an unweighted sequential WR sampling technique.

For step 802 of FIG. 8, a variable r is initialized to the size of sample relation S to be obtained from relation R. For step 804, a variable i is initialized to zero. The variable i maintains a count of the number of tuples that have been obtained from relation R for evaluation. For step 806, a reservoir array A[1 . . . r] of r dummy tuples is initialized. The r tuples of the reservoir array are reset with tuples from relation R to obtain sample S.

Each tuple of relation R is evaluated for steps 808, 810, 812, 814, 816, and 818 to determine whether any one or more of the tuples of the reservoir array are to be reset to that tuple from relation R.

For step 808, a next tuple t in relation R is obtained for evaluation, and the variable i is incremented by one for step 810. For step 812, a variable j is initialized to one. The variable j is used to index each tuple in the reservoir array. For step 814, the jth tuple of the reservoir array is reset to be tuple t with a probability based on the number of tuples that have been obtained from relation R for evaluation, such as 1/i for example. The variable j is incremented by one for step 816 and compared to r for step 818. If the variable j is less than or equal to r for step 818, steps 814–818 are repeated so the other tuples of the reservoir array may be possibly reset to be tuple t. When the variable j is greater than r, steps 808–818 are repeated until all tuples of relation R have been evaluated as determined for step 808. The r tuples of the reservoir array are then output as sample S for step 820.

Although the r tuples of sample S are not made available until each tuple of relation R has been evaluated, sampling tuples in this manner does not require the size n of relation R and may therefore be used to sample tuples from intermediate relations, for example, of unknown size. Sampling tuples in this manner also uses minimal auxiliary memory or storage as only r tuples of relation R are stored at a time.

The sampling technique of FIG. 8 may also be used for block-level sampling of a relation materialized on a disk, for example, and may be used to skip over a random set of tuples.

Weighted Sequential WR Sampling

To obtain a weighted WR sample S of an f-fraction or r tuples from a relation R of n tuples with each tuple t of relation R having a specified weight w(t), for example in performing a sample operator such as SAMPLE(R, r,WR, w(t)), database server 620 independently chooses each tuple t of sample S at random from relation R with a probability based on weight w(t) of tuple t.

Database server 620 may perform weighted sequential WR sampling in one pass by obtaining a tuple t from relation R and its specified weight w(t), selectively outputting one or more copies of tuple t based on its weight w(t) and based on a probability, and repeating this technique for other tuples of relation R to form sample S. As one example, database server 620 may perform weighted sequential WR sampling in accordance with a flow diagram 900 of FIG. 9.

Figure 9:
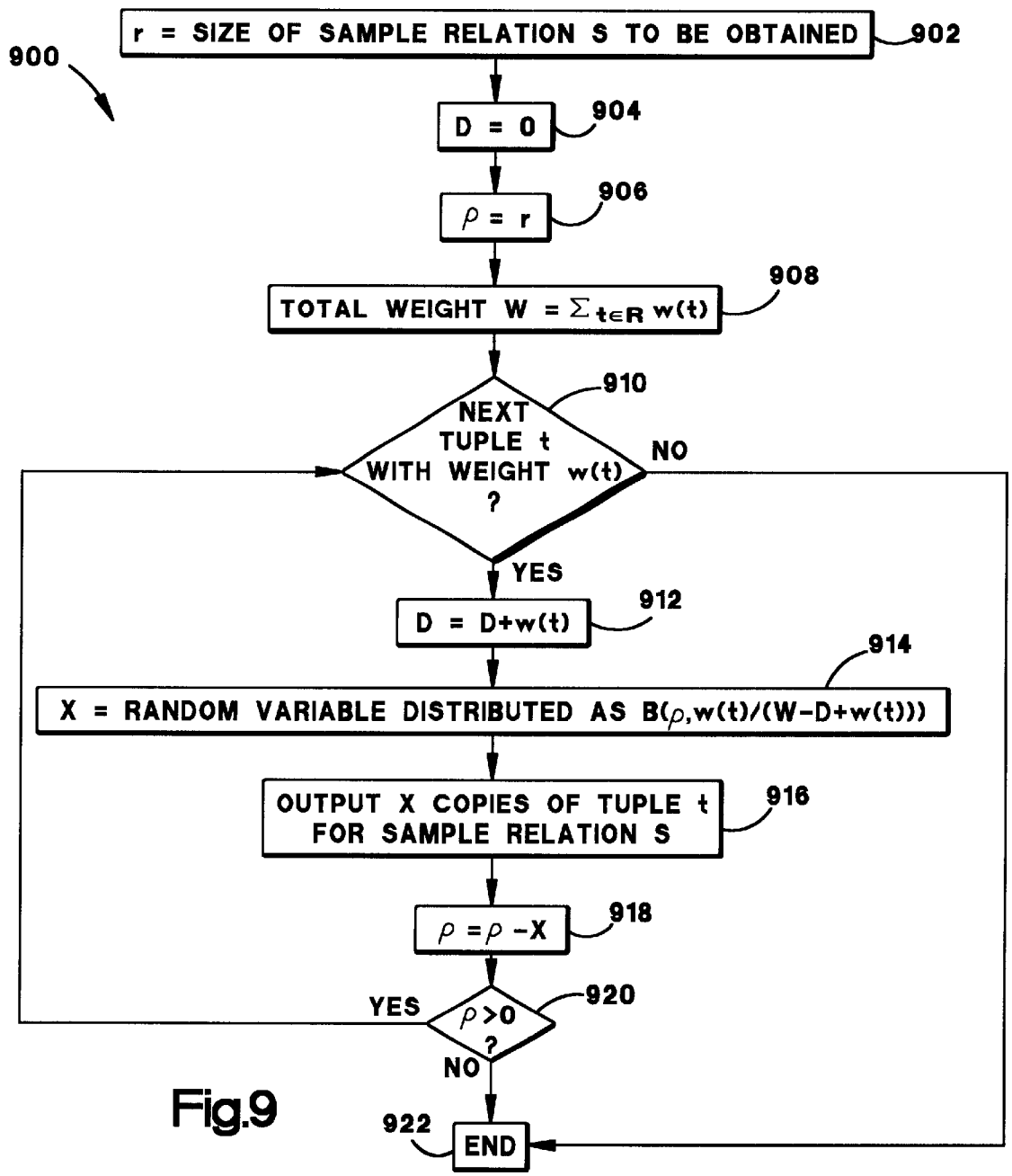
FIG. 9 illustrates a flow diagram for one example of a weighted sequential WR sampling technique.

For step 902 of FIG. 9, a variable r is initialized to the size of sample relation S to be obtained from relation R. For step 904, a variable D is initialized to zero. The variable D maintains a sum of the weights of the tuples that have been obtained from relation R for evaluation. For step 906, the variable ρ is initialized to r. The variable ρ maintains a count of the number of tuples remaining to be output for sample S. For step 908, a variable W is initialized to the sum of the weights of all n tuples of relation R.

Each tuple of relation R is evaluated for steps 910, 912, 914, 916, 918, and 920 to determine whether any and, if so, how many copies of that tuple are to be output for sample S.

For step 910, a next tuple t in relation R is obtained with its weight w(t) for evaluation, and the variable D is increased by the weight w(t) for step 912. For step 914, a random variable X distributed as a binomial distribution is determined. An exemplary binomial distribution has as parameters the number ρ of tuples yet to be obtained for sample S and a probability based on weight w(t) of tuple t and the sum of the weight of the tuples that have yet to be evaluated from relation R, such as B(ρ,w(t)/(W−D+w(t))) for example. Noting the random variable X is an integer greater than or equal to zero and less than or equal to ρ, X copies of tuple t are output for sample S for step 916. Although illustrated as being distributed in accordance with the binomial distribution B(ρ,w(t)/(W−D+w(t))) for random sampling, the variable X may be determined in accordance with any suitable probability, such as for biased sampling for example. The number ρ of tuples yet to be obtained for sample S is accordingly reduced by X for step 918 and compared to zero for step 920.

If ρ is greater than zero for step 920, steps 910–920 are repeated until all tuples of relation R have been evaluated as determined for step 910 or until the number ρ of tuples yet to be obtained for sample S has been reduced to zero as determined for step 920. Flow diagram 900 then ends for step 922.

The sampling technique of FIG. 9 extends the unweighted sampling technique of FIG. 7 to weighted sampling. Indeed, the sampling technique of FIG. 9 may be used to implement the sampling technique of FIG. 7 by specifying the same weight for each tuple t of relation R, such as w(t)=1 for example. The sampling technique of FIG. 9 generally shares the features of the sampling technique of FIG. 7, although the sampling technique of FIG. 9 requires the total weight W of the tuples of relation R. As one example, the total weight W may be determined in determining the weight w(t) for each tuple t of relation R. The total weight W of relation R may optionally be designated as a parameter for a sample operator.

Database server 620 may also perform weighted sequential WR sampling in one pass by obtaining a tuple t from relation R and its specified weight w(t), selectively resetting one or more tuples of a reservoir to be tuple t based on its weight w(t) and based on a probability, and repeating this technique for other tuples of relation R to form sample S. As one example, database server 620 may perform weighted sequential WR sampling in accordance with a flow diagram 1000 of FIG. 10.

Figure 10:
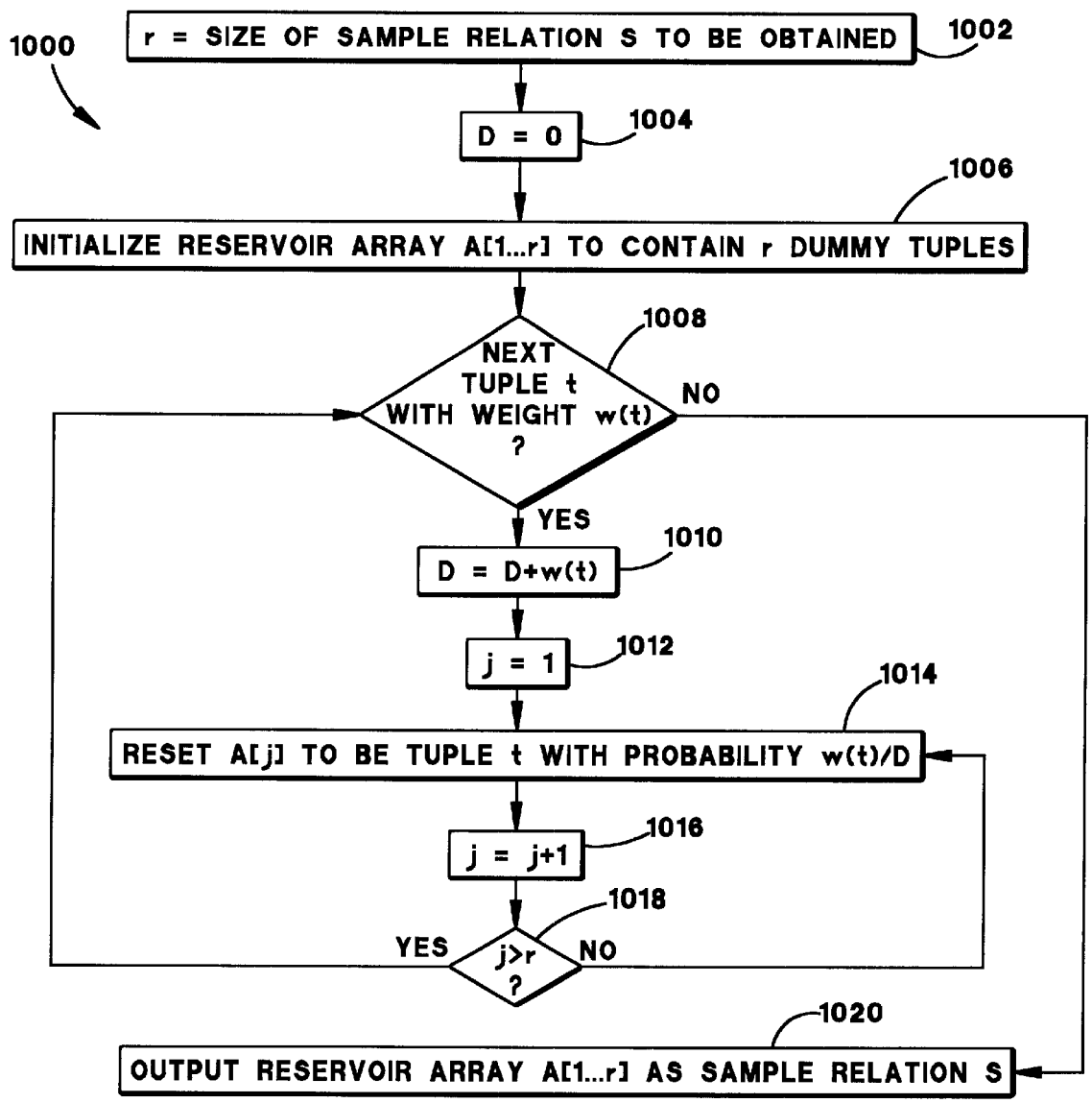
FIG. 10 illustrates a flow diagram for another example of a weighted sequential WR sampling technique.

For step 1002 of FIG. 10, a variable r is initialized to the size of sample relation S to be obtained from relation R. For step 1004, a variable D is initialized to zero. The variable D maintains a sum of the weights of the tuples that have been obtained from relation R for evaluation. For step 1006, a reservoir array A[1...r] of r dummy tuples is initialized. The r tuples of the reservoir array are reset with tuples from relation R to obtain sample S.

Each tuple of relation R is evaluated for steps 1008, 1010, 1012, 1014, 1016, and 1018 to determine whether any one or more of the tuples of the reservoir array are to be reset to that tuple from relation R.

For step 1008, a next tuple t in relation R is obtained with its weight w(t) for evaluation, and the variable D is increased by w(t) for step 1010. For step 1012, a variable j is initialized to one. The variable j is used to index each tuple in the reservoir array. For step 1014, the jth tuple of the reservoir array is reset to be tuple t with a probability based on weight w(t) of tuple t and the sum of the weight of the tuples that have been obtained from relation R for evaluation, such as w(t)/D for example. The variable j is incremented by one for step 1016 and compared to r for step 1018. If the variable j is less than or equal to r for step 1018, steps 1014–1018 are repeated so the other tuples of the reservoir array may be possibly reset to be tuple t. When the variable j is greater than r, steps 1008–1018 are repeated until all tuples of relation R have been evaluated as determined for step 1008. The r tuples of the reservoir array are then output as sample S for step 1020.

The sampling technique of FIG. 10 extends the unweighted sampling technique of FIG. 8 to weighted sampling. Indeed, the sampling technique of FIG. 10 may be used to implement the sampling technique of FIG. 8 by specifying the same weight for each tuple t of relation R, such as w(t)=1 for example. The sampling technique of FIG. 10 generally shares the features of the sampling technique of FIG. 8.

Weighted Sequential WoR Sampling

A weighted without replacement (WoR) sample S of an f-fraction or r tuples from a relation R of n tuples with each tuple t of relation R having a specified non-negative integer weight w(t) is assumed to be the same as an unweighted WoR sample from a modification of relation R to a relation $R^w$ containing w(t) copies of each tuple t of relation R. Database server 620 may perform weighted WoR sampling, for example, in performing a sample operator such as SAMPLE(R, r, WoR, w(t)).

Database server 620 [3] may perform weighted sequential WoR sampling in one pass by obtaining a tuple t from relation R and its specified weight w(t), selectively outputting one or more copies of tuple t based, on its weight w(t) and based on a probability, and repeating this technique for other tuples of relation R to form sample S. As one example, database server 620 may perform weighted sequential WoR sampling in accordance with a flow diagram 1100 of FIG. 11.

Figure 11:
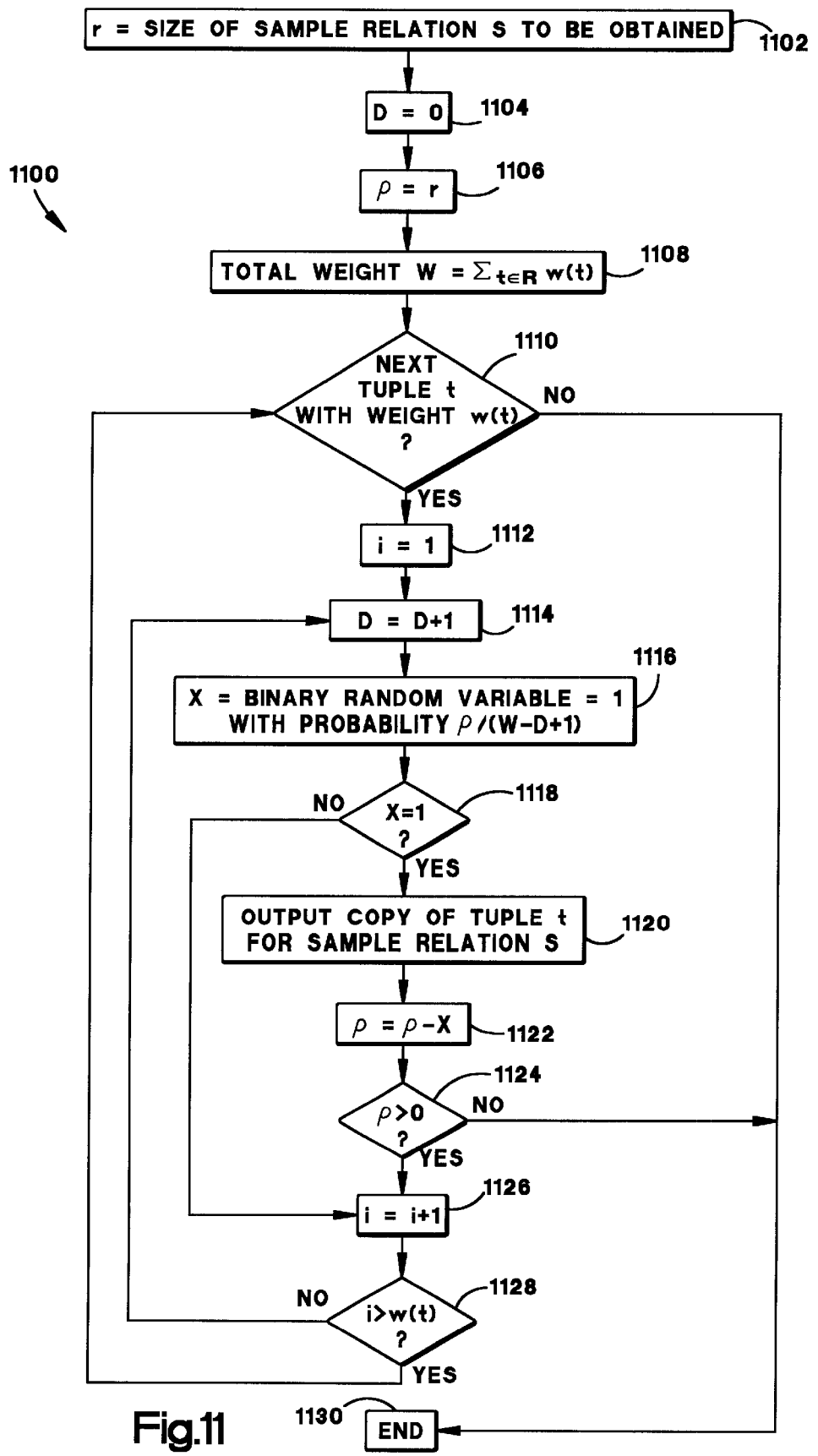
FIG. 11 illustrates a flow diagram for one example of a weighted sequential without replacement (WoR) sampling technique.

For step 1102 of FIG. 11, a variable r is initialized to the size of sample relation S to be obtained from relation R. For step 1104, a variable D is initialized to zero. The variable D maintains a sum of the weights of the tuples that have been obtained from relation R for evaluation. For step 1106, the variable ρ is initialized to r. The variable ρ maintains a count of the number of tuples remaining to be output for sample S. For step 1108, a variable W is initialized to the sum of the weights of all n tuples of relation R.

Each tuple of relation R is evaluated for steps 1110, 1112, 1114, 1116, 1118, 1120, 1122, 1124, 1126, and 1128 to determine whether any and, if so, how many copies of that tuple are to be output for sample S.

For step 1110, a next tuple t in relation R is obtained with its weight w(t) for evaluation. A variable i is initialized to one for step 1112. The variable i maintains an iteration count for evaluating tuple t w(t) times for output for sample S. The variable D is incremented for step 1114. For step 1116, a binary random variable X is set to one with a probability based on the number ρ of tuples yet to be obtained for sample S and the number of possible tuples that may be output for sample S, such as ρ/(W−D+1) for example. The variable X is compared to one for step. 1118. If the variable X is one, a copy of tuple t is output for sample S for step 1120. The number ρ of tuples yet to be obtained for sample S is accordingly reduced by X or one for step 1122 and compared to zero for step 1124. If ρ is greater than zero for step 1124, the variable i is then incremented for step 1126. If the variable X is zero for step 1118, the variable i is incremented for step 1126 without output of tuple t for this ith iteration of steps 1114–1128.

The variable i is compared to weight w(t) for step 1128. If the variable i is not greater than weight w(t), steps 1114–1128 are repeated until the variable i is greater than zero as determined for step 1128 or until the number ρ of tuples yet to be obtained for sample S has been reduced to zero as determined for step 1124. If the variable i is greater than weight w(t), steps 1110–1128 are repeated until all tuples of relation R have been evaluated as determined for step 1110 or until the number ρ of tuples yet to be obtained for sample S has been reduced to zero as determined for step 1124. Flow diagram 1100 then ends for step 1130.

Rather than iteratively evaluating each tuple t w(t) times for steps 1114–1128, a suitable random generation technique that outputs X number of copies of tuple t, where $0 \leq X \leq w(t)$, may be used for other examples.

The sampling technique of FIG. 11 generally shares the features of the sampling technique of FIG. 9.

Database server 620 may also perform weighted sequential WoR sampling in one pass by obtaining a tuple t from relation R and its specified weight w(t), selectively resetting one or more tuples of a reservoir to be tuple t based on its weight w(t) and based on a probability, and repeating this technique for other tuples of relation R to form sample S. As one example, database server 620 may perform weighted sequential WoR sampling in accordance with a flow diagram 1200 of FIG. 12.

Figure 12:
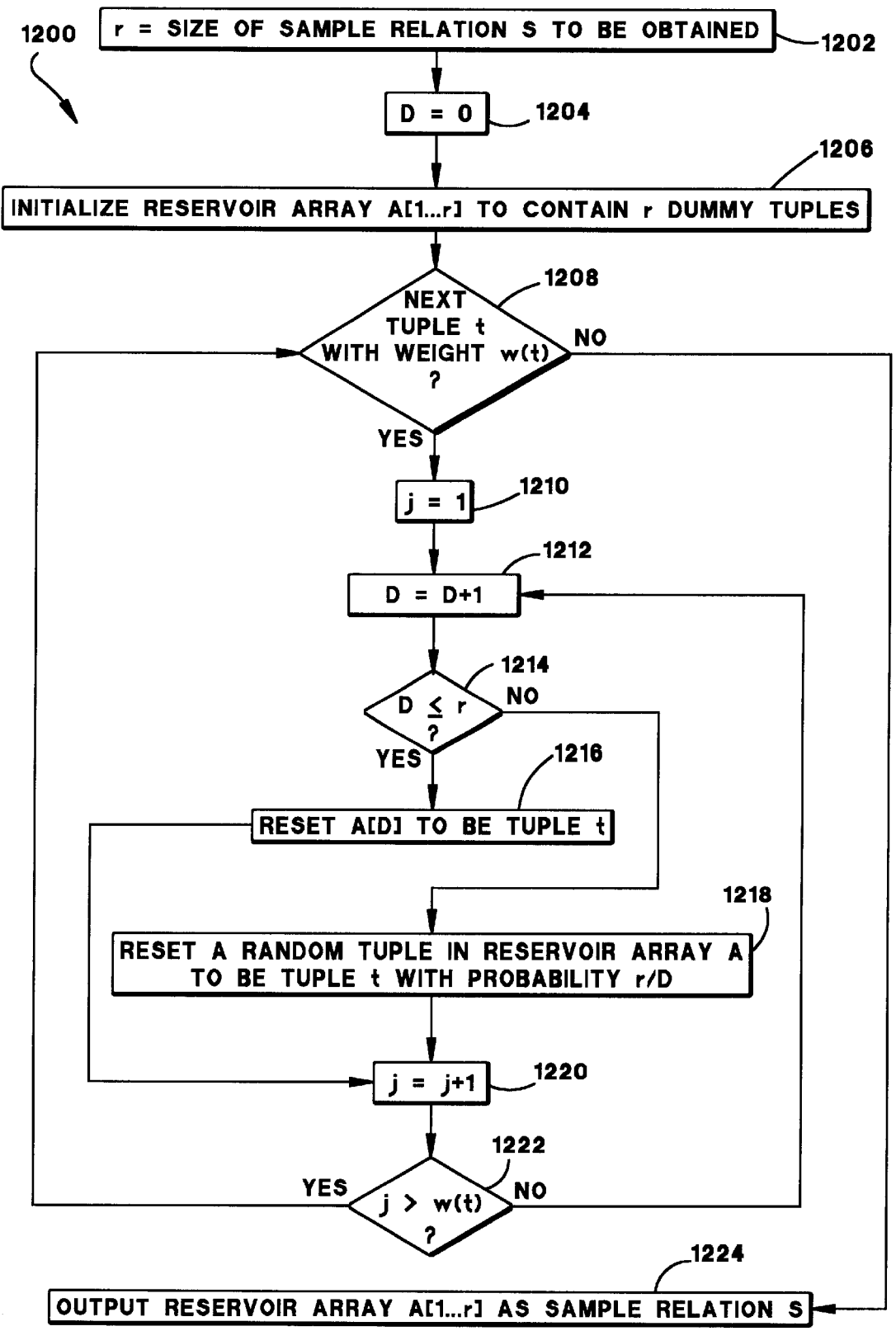
FIG. 12 illustrates a flow diagram for another example of a weighted sequential WoR sampling technique.

For step 1202 of FIG. 12, a variable r is initialized to the size of sample relation S to be obtained from relation R. For step 1204, a variable D is initialized to zero. The variable D maintains a sum of the weights of the tuples that have been obtained from relation R for evaluation. For step 1206, a reservoir array A[1...r] of r dummy tuples is initialized. The r tuples of the reservoir array are reset with tuples from relation R to obtain sample S.

Each tuple of relation R is evaluated for steps 1208, 1210, 1212, 1214, 1216, 1218, 1220, and 1222 to determine whether any one or more of the tuples of the reservoir array are to be reset to that tuple from relation R.

For step 1208, a next tuple t in relation R is obtained with its weight w(t) for evaluation. A variable j is initialized to one for step 1210. The variable j maintains an iteration count for evaluating tuple t w(t) times for output for sample S. The variable D is incremented for step 1212. For step 1214, the variable D is compared to r. If the variable D is less than or equal to r, the tuple A[D] of the reservoir array is reset to be tuple t for step 1216. Otherwise, for step 1218, a random tuple in the reservoir array is reset to be tuple t with a probability based on the sample size r and the total number of times a tuple from relation R has been evaluated for output for sample S, such as r/D for example. Following step 1216 or 1218, the variable j is incremented for step 1220 and compared to w(t) for step 1222.

If the variable j is less than or equal to w(t) for step 1222, steps 1212–1222 are repeated so the other tuples of the reservoir array may be possibly reset to be tuple t. When the variable j is greater than w(t), steps 1208–1222 are repeated until all tuples of relation R have been evaluated as determined for step 1208. The r tuples of the reservoir array are then output as sample S for step 1224.

Rather than iteratively evaluating each tuple t w(t) times for steps 1212–1222, a suitable random generation technique that outputs X number of copies of tuple t, where $0 \leq X \leq w(t)$, may be used for other examples.

The sampling technique of FIG. 12 generally shares the features of the sampling technique of FIG. 10.

Weighted Sequential CF Sampling

A weighted independent coin flips (CF) sample S of an f-fraction or r tuples from a relation R of n tuples with each tuple t of relation R having a specified non-negative integer weight w(t) is assumed to be the same as an unweighted CF sample from a modification of relation R to a relation $R^W$ containing w(t) copies of each tuple t of relation R. Database server 620 may perform weighted CF sampling, for example, in performing a sample operator such as SAMPLE (R, r, CF, w(t)).

Database server 620 may perform weighted sequential CF sampling in one pass by obtaining a tuple t from relation R and its specified weight w(t), selectively outputting one or more copies of tuple t based on its weight w(t) and based on a probability, and repeating this technique for other tuples of relation R to form sample S. As one example, database server 620 may perform weighted sequential CF sampling in accordance with a flow diagram 1300 of FIG. 13.

Figure 13:
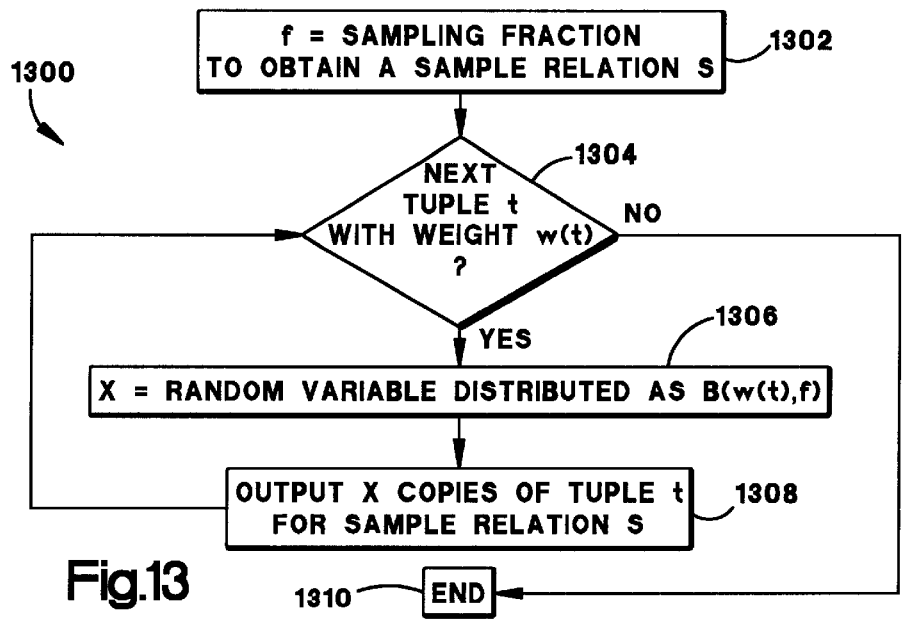
FIG. 13 illustrates a flow diagram for one example of a weighted sequential independent coin flips (CF) sampling technique.

For step 1302 of FIG. 13, a variable f is set to the fraction of tuples to be sampled from relation R. For step 1304, a next tuple t in relation R is obtained with its weight w(t) for evaluation. For step 1306, a random variable X distributed as a binomial distribution is determined. An exemplary binomial distribution has as parameters the weight w(t) and a probability based on fraction f, such as B(w(t),f) for example. Noting the random variable X is an integer greater than or equal to zero and less than or equal to w(t), X copies of tuple t are output for sample S for step 1308. Although illustrated as being distributed in accordance with the binomial distribution B(w(t),f) for random sampling, the random variable X may be determined in accordance with any suitable probability, such as for biased sampling for example. Steps 1304–1308 are repeated until all tuples of relation R have been evaluated as determined for step 1304. Flow diagram 1300 then ends for step 1310.

Sampling tuples in this manner advantageously sequentially produces the r tuples of sample S in the same relative order as in relation R and uses minimal auxiliary memory as only one tuple of relation R is stored at a time. Sampling tuples in this manner also does not require the size n or total weight W of the relation R and may therefore be used to sample tuples from intermediate relations, for example, of unknown size.

Sampling Conversions

Database server 620 may also perform sampling for one type of semantics using a sampling technique of different semantics.

As one example, database server 620 can convert a WR sampling technique to a WoR sampling technique by checking each newly sampled tuple and rejecting that tuple if it has already been generated.

As another example, database server 620 can convert a CF sampling technique to a WoR sampling technique by sampling a slightly larger fraction f to ensure that at least f-fraction tuples are obtained and rejecting an appropriate number of tuples such that f-fraction of tuples are obtained. The f-fraction of tuples may also be obtained from the f-fraction of tuples by obtaining a WoR sample of f-fraction tuples from the CF sample of f-fraction tuples.

As yet another example, database server 620 can convert a WoR sampling technique to a WR sampling technique by sampling with replacement from the WoR sample.

Sampling Over Joins

Database server 620 supports sampling over a join of two relations $R_1$ and $R_2$ without requiring the computation of the full join $J=R_1 \infty R_2$ and without requiring the materialization of both relations $R_1$ and $R_2$ and/or indexes on the join attribute values of both relations $R_1$ and $R_2$.

Referring to the previous example where:

$$R_1(A,B) = \{(a_1,b_0), (a_2,b_1), (a_2,b_2), (a_2,b_3), \ldots (a_2,b_n)\}$$

and $$R_2(A,C) = \{(a_2,c_0), (a_1,c_1), (a_1,c_2), (a_1,c_3), \ldots (a_1,c_n)\},$$

the projection, after removal of duplicates, of the relation $J=R_1 \infty R_2$ onto attributes A and B, for example, does not yield a uniform random sample of relation $R_1$ but rather gives a biased or weighted sample of relation $R_1$ where each tuple of relation $R_1$ is sampled with a probability dependent on the number of tuples in relation $R_2$ joining with relation $R_1$. Specifically, the tuple $(a_1,b_0)$ of relation $R_1$ is sampled with probability 1/2 while the remaining tuples are each sampled with probability 1/2n. Similarly, the tuple $(a_2,c_0)$ of relation $R_2$ is sampled with probability 1/2 while the remaining tuples are each sampled with probability 1/2n. The skewness of the resulting distribution stems from the removal of duplicates. Also, the relatively high skew in 109 relations $R_1$ and $R_2$ prevents samples of relations $R_1$ and $R_2$ from reflecting frequently appearing attribute values in the join output adequately.

Although a join of random samples of operand relations $R_1$ and $R_2$ will not likely give a random sample of the join of operand relations $R_1$ and $R_2$, a sample of the join of relations $R_1$ and $R_2$ may be obtained from non-uniform samples of relations $R_1$ and $R_2$.

Considering a tuple $t=(a_1,b_0) \in R_1$ and its influence on relation $J=R_1 \infty R_2$, the number of tuples in relation $R_1$ containing the value $a_1$ in attribute A is one, that is $m_1(a_1)=1$, yet the number $J_t(R_2)$ of tuples in relation $R_2$ joining with tuple t is $m_2(a_1)$. Although a random sample of relation $R_1$ will unlikely have the one tuple with the A-value $a_1$, the fraction of tuples in relation J having A-value $a_1$ is $m_2(a_1)/|J|$ which could be relatively large. The structure of relation J is more likely reflected in a sample $S_1$ of relation $R_1$ where a tuple t from relation $R_1$ is sampled with a probability based on the number $m_2(t.A)$ of matching join attribute values t.A in relation $R_2$.

Database server 620 may therefore obtain a sample S of the join of relations $R_1$ and $R_2$ by sampling tuples from relation $R_1$ based on the number of matching join attribute values in relation $R_2$ and joining tuples of the resulting sample $S_1$ with those of relation $R_2$. Database server 620 may use frequency statistics on the join attribute values of relation $R_2$ in sampling tuples of relation $R_1$. Because relation $R_2$ may or may not be materialized and/or indexed, how database server 620 obtains a sample of the join of relations $R_1$ and $R_2$ depends on the availability of information for relations $R_1$ and/or $R_2$ such as in the following cases:

Case A: no information is available for either relation $R_1$ or $R_2$;

Case B: no information is available for relation $R_1$ but indexes and/or statistics are available for relation $R_2$; or Case C: indexes and/or statistics are available for relations $R_1$ and $R_2$.

Any sampling technique for a case with less available information will also apply for a case with more available information. When no information is available for a relation, database server 620 may assume the relation is not materialized but rather is produced as a stream by a pipeline process.

For Case A, database 620 has no frequency statistics or indexes for relation $R_2$ to help guide any sampling of relation $R_1$. Database server 620 may therefore use the sampling technique of FIG. 2 to compute the full join $J=R_1 \infty R_2$ and obtain a sample relation S of r tuples from relation J by rejection sampling each tuple of relation J with probability $1/|J|$.

Although the prior art sampling technique of FIG. 4 avoids having to compute the full join $J=R_1 \infty R_2$, in practice it requires the materialization of relation $R_1$ and an index for random access for relation $R_1$ for step 406, full statistics on the join attribute values of relation $R_2$ for step 410, and the materialization of relation $R_2$ and an index for random access of relation $R_2$ for step 408. The sampling technique of FIG. 4 therefore applies only to Case C of the above three cases.

For Case B, however, database server 620 may avoid having to compute the full join $J=R_1 \infty R_2$ as well as avoid the requirement for the materialization of both relations $R_1$ and $R_2$ and indexes on the join attribute values of both relations $R_1$ and $R_2$ because database server 620 may obtain a sample relation, S of r tuples of the join of relations $R_1$ and $R_2$ using frequency statistics and/or an index on the join attribute values of relation $R_2$ in sampling tuples of relation $R_1$.

Join Sample Operator

Database server 620 supports a join sample operator that may be inserted into a query execution plan or tree to obtain a sample S from a join of two relations $R_1$ and $R_2$ using designated sampling semantics.

The join sample operator may have as parameters relations $R_1$ and $R_2$, the size of sample S, and the sampling semantics to be used in obtaining sample S. One exemplary join sample operator is JOINSAMPLE(relation $R_1$, relation $R_2$, sample size, semantics). The sample size and sampling semantics parameters may optionally be set or predetermined by the join sampling technique performed by database server 620 in performing the join sample operator.

The sample size parameter may be expressed as a number r of tuples to be obtained from the resulting relation $J=R_1 \infty R_2$ for sample S or as a fraction f of the n tuples of relation J to be obtained for sample S. Whether the number r or fraction f is to be designated may depend on the join sampling technique performed by database server 620 in performing the join sample operator. Where the number n of tuples of relation J is known or may be determined, however, database server 620 may determine the fraction f for a designated number r and may also determine the number r for a designated fraction f.

The sampling semantics parameter may identify any suitable sampling semantics such as, for example, with replacement (WR), without replacement (WoR), or independent coin flips (CF) semantics.

Database server 620 may perform any suitable join sampling technique in performing the join sample operator. Database server 620 may perform the join sampling technique of FIG. 2, for example, using for step 204 the sampling semantics as designated by a join sample operator or as predetermined by database server 620. Database server 620 may avoid materializing relation J for step 204 by performing a sequential sample of relation J using any suitable sequential sampling technique, such as the sampling technique of FIG. 7 or 8 for WR semantics for example. Database server 620 may also perform the join sampling technique of FIG. 4, for example, using for step 406 the sampling semantics as designated by a join sample operator or as predetermined by database server 620. To avoid having to compute the full join $J=R_1 \infty R_2$ as for the join sampling technique of FIG. 2 and to avoid the requirement for the materialization of and indexes on-both relations $R_1$ and $R_2$ as for the join sampling technique of FIG. 4, database server 620 may perform the join sampling techniques of FIG. 14, 15, 16, or 17.

Stream Sampling

Figure 14:
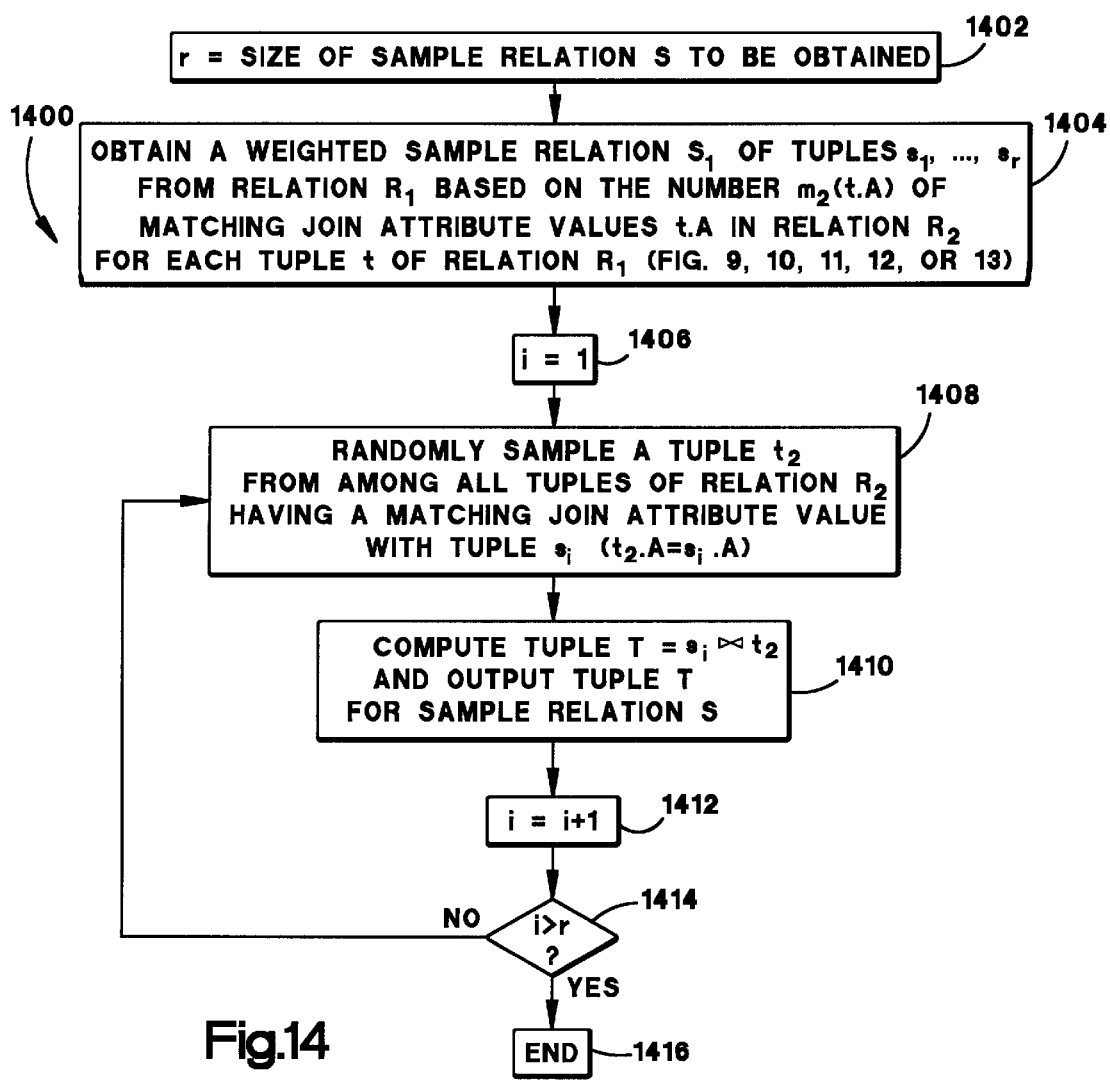
FIG. 14 illustrates a flow diagram for one example of a stream sampling technique over join operations.

Database server 620 for one example may perform a stream sampling technique over joins in accordance with a flow diagram 1400 of FIG. 14.

For step 1402 of FIG. 14, a variable r is initialized to the size of sample relation S to be obtained from the join of relations $R_1$ and $R_2$. For step 1404, a weighted sample relation $S_1$ of r tuples $s_1, \ldots, s_r$ is obtained from relation $R_1$ based on the number $m_2(t.A)$ of matching join attribute values t.A in relation $R_2$ for each tuple t of relation $R_1$. Any suitable weighted sampling technique using the sampling semantics as designated by a join sample operator or as predetermined by database server 620 may be used to obtain sample relation $S_1$.

For WR semantics, the weighted sampling technique of FIG. 9 or 10, for example, may be used with each tuple t of relation $R_1$ having a specified weight proportional to the number of tuples in relation $R_2$ having a join attribute value that matches that of tuple t. That is, the weight w(t) for each tuple $t \in R_1$ is set to $m_2(t.A)$. For WoR semantics, the weighted sampling technique of FIG. 11 or 12, for example, may be used with this same weight specification.

For CF semantics, the weighted sampling technique of FIG. 13, for example, may be used with this same weight specification, noting that the sampling fraction f for the sampling technique of FIG. 13 may be determined from the sample size r of step 1402 and that the sample size r may be redefined for step 1404 as the sampling technique of FIG. 13 may not return a sample relation $S_1$ of the original sample size r. Alternatively, the sampling fraction f may be initialized for step 1402, and the sample size r may be determined based on the number of tuples the sampling technique of FIG. 13 returns for sample relation $S_1$.

For step 1406, a variable i is initialized to one. The variable i is used to denote the ith tuple $s_i$ of sample relation $S_1$. For step 1408, a tuple $t_2$ is randomly sampled from among all tuples of relation $R_2$ having a matching join attribute value with tuple $s_i$ of sample relation $S_1$, that is $t_2.A=s_i.A$. For step 1410, a tuple T is computed as the join $T=s_i \infty t_2$ and output for sample relation S. The variable i is incremented for step 1412 and compared to r for step 1414. If i is less than or equal to r, steps 1408–1414 are repeated for the remaining tuples $s_i$ of sample relation $S_1$. If i is greater than r, indicating all tuples of sample relation $S_1$ have been joined with a tuple from relation $R_2$, flow diagram 1400 ends for step 1416.

In practice, the stream sampling technique of FIG. 14 may be used where no information is available for relation $R_1$ and may assume for step 1404 the availability of frequency statistics on the join attribute values for relation $R_2$ and for step 1408 an index for random access of relation $R_2$. Whether relation $R_1$ is materialized or produced as a stream from a pipeline process, the sampling technique of FIG. 14 may sequentially sample tuples from relation $R_1$ for step 1404 in one pass. As each tuple $s_i$ of sample relation $S_1$ is sequentially output, then, steps 1408 and 1410 may be performed to produce and output each tuple T for sample relation S sequentially.

Group Sampling

Figure 15:
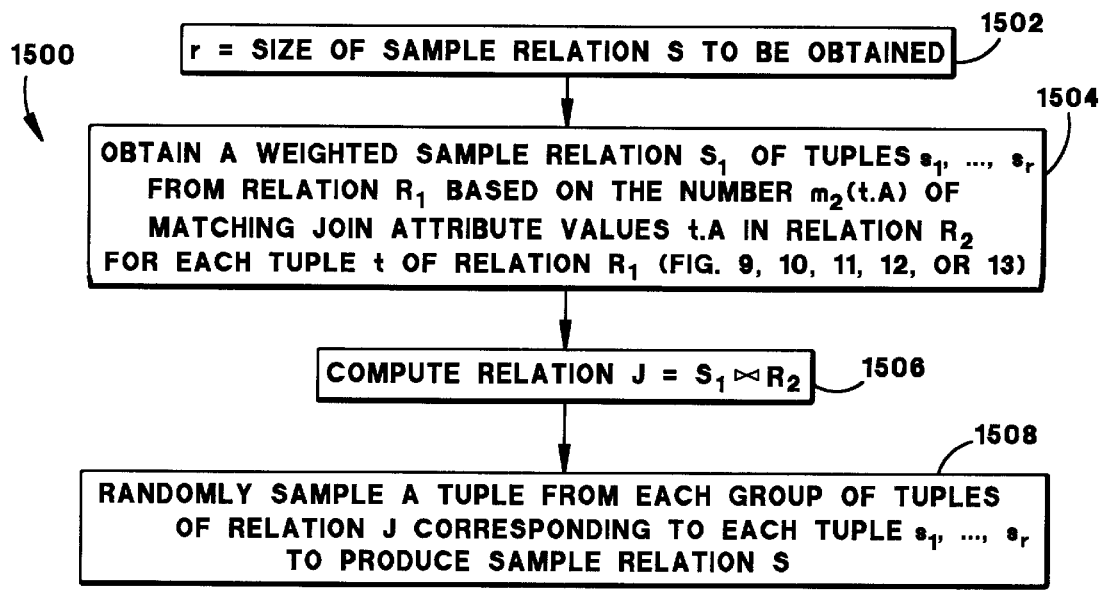
FIG. 15 illustrates a flow diagram for one example of a group sampling technique over join operations.

Database server 620 for another example may perform a group sampling technique over joins in accordance with a flow diagram 1500 of FIG. 15.

For step 1502 of FIG. 15, a variable r is initialized to the size of sample relation S to be obtained from the join of relations $R_1$ and $R_2$. For step 1504, a weighted sample relation $S_1$ of r tuples $s_1, \ldots, s_r$ is obtained from relation $R_1$ based on the number $m_2(t.A)$ of matching join attribute values t.A in relation $R_2$ for each tuple t of relation $R_1$. Any suitable weighted sampling technique using the sampling semantics as designated by a join sample operator or as predetermined by database server 620 may be used to obtain sample relation $S_1$.

For WR semantics, the weighted sampling technique of FIG. 9 or 10, for example, may be used with each tuple t of relation $R_1$ having a specified weight proportional to the number of tuples in relation $R_2$ having a join attribute value that matches that of tuple t. That is, the weight w(t) for each tuple $t \in R_1$ is set to $m_2(t.A)$. For WoR semantics, the weighted sampling technique of FIG. 11 or 12, for example, may be used with this same weight specification.

For CF semantics, the weighted sampling technique of FIG. 13, for example, may be used with this same weight specification, noting that the sampling fraction f for the sampling technique of FIG. 13 may be determined from the sample size r of step 1502 and that the sample size r may be redefined for step 1504 as the sampling technique of FIG. 13 may not return a sample relation $S_1$ of the original sample size r. Alternatively, the sampling fraction f may be initialized for step 1502, and the sample size r may be determined based on the number of tuples the sampling technique of FIG. 13 returns for sample relation $S_1$.

For step 1506, a relation J is computed as the join $J=S_1 \infty R_2$. The relation J has tuples grouped by the tuples $s_1, \ldots, s_r$ of sample relation $S_1$. For step 1508, one tuple is randomly sampled from each group of tuples of relation J corresponding to each tuple $s_1, \ldots, s_r$ to produce sample relation S. Any suitable sampling technique, such as the sampling technique of FIG. 7 or 8 for example, may be used to sample a tuple from the group corresponding to each tuple $s_i$. For the sampling technique of FIG. 7, the size of each group is $m_2(s_i.A)$.

The group sampling technique of FIG. 15 may be used where no information is available for relation $R_1$ and where frequency statistics on the join attribute values yet no index is available for relation $R_2$. Whether relation $R_1$ is materialized or produced as a stream from a pipeline process, the sampling technique of FIG. 15 may sequentially sample tuples from relation $R_1$ for step 1504 in one pass.

Count Sampling

Figure 16:
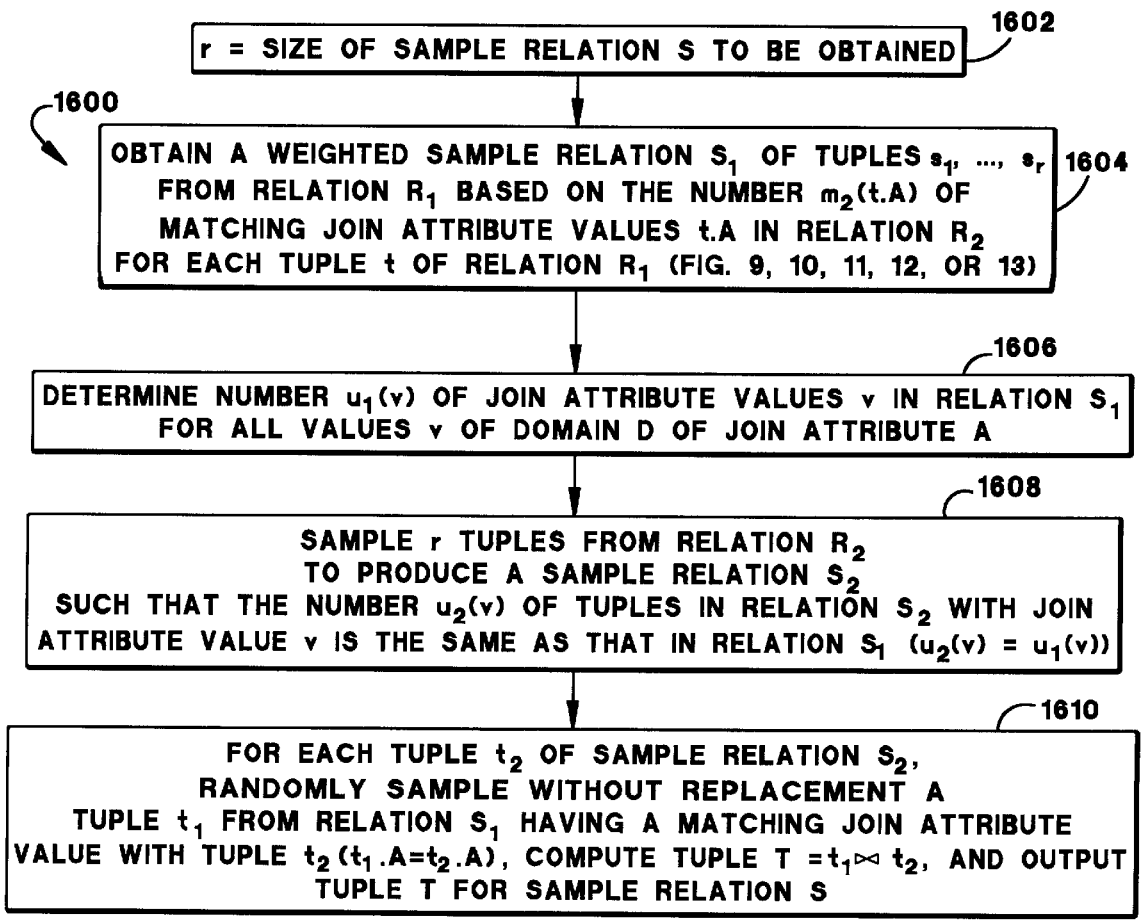
FIG. 16 illustrates a flow diagram for one example of a count sampling technique over join operations.

Database server 620 for another example may perform a count sampling technique over joins in accordance with a flow diagram 1600 of FIG. 16.

For step 1602 of FIG. 16, a variable r is initialized to the size of sample relation S to be obtained from the join of relations $R_1$ and $R_2$. For step 1604, a weighted sample relation $S_1$ of r tuples $s_1, \ldots, s_r$ is obtained from relation $R_1$ based on the number $m_2(t.A)$ of matching join attribute values t.A in relation $R_2$ for each tuple t of relation $R_1$. Any suitable weighted sampling technique using the sampling semantics as designated by a join sample operator or as predetermined by database server 620 may be used to obtain sample relation $S_1$.

For WR semantics, the weighted sampling technique of FIG. 9 or 10, for example, may be used with each tuple t of relation $R_1$ having a specified weight proportional to the number of tuples in relation $R_2$ having a join attribute value that matches that of tuple t. That is, the weight w(t) for each tuple $t \in R_1$ is set to $m_2(t.A)$. For WoR semantics, the weighted sampling technique of FIG. 11 or 12, for example, may be used with this same weight specification.

For CF semantics, the weighted sampling technique of FIG. 13, for example, may be used with this same weight specification, noting that the sampling fraction f for the sampling technique of FIG. 13 may be determined from the sample size r of step 1602 and that the sample size r may be redefined for step 1604 as the sampling technique of FIG. 13 may not return a sample relation $S_1$ of the original sample size r. Alternatively, the sampling fraction f may be initialized for step 1602, and the sample size r may be determined based on the number of tuples the sampling technique of FIG. 13 returns for sample relation $S_1$.

For step 1606, sample relation $S_1$ is materialized and the number $u_1(v)$ of join attribute values v in sample relation $S_1$ is determined for all values v of domain D of join attribute A. For step 1608, r tuples are sampled from relation $R_2$ to produce a sample relation $S_2$ such that the number $u_2(v)$ of tuples in relation $S_2$ with join attribute value v is the same as that in relation $S_1$, that is $u_2(v)=u_1(v)$. Any suitable sampling technique may be used for step 1608. As one example, an unweighted sampling technique using the sampling semantics as designated by a join sample operator or as predetermined by database server 620 may be used to obtain sample relation $S_2$. For WR semantics, step 1608 for one example may be performed by scanning relation $R_2$ and separately performing, for each join attribute value v, the sampling technique of FIG. 7 on the tuple(s) of relation $R_2$ having the join attribute value v, noting the size of each relation being sampled is $m_2(v)$ and the size of each sample to be obtained is $u_1(v)$ for the sampling technique of FIG. 7. For each join attribute value v, then, a sample of $u_1(v)$ tuples are obtained with replacement from the $m_2(v)$ tuples of relation $R_2$.

For each tuple of sample relation $S_2$, for step 1610, a tuple having the same join attribute value from sample relation $S_1$ is randomly sampled without replacement and joined with the tuple from sample relation $S_2$ to produce a tuple for sample relation S. Sample relation $S_2$ may optionally be materialized and randomly matched to sample relation $S_1$ for step 1610.

The count sampling technique of FIG. 16 may be used where no information is available for relation $R_1$ and where frequency statistics on the join attribute values yet no index is available for relation $R_2$. Whether relation $R_1$ is materialized or produced as a stream from a pipeline process, the sampling technique of FIG. 16 may sequentially sample tuples from relation $R_1$ for step 1604 in one pass. The count sampling technique of FIG. 16 also does not require an index on relation $R_2$ as relation $R_2$ may be scanned only once for step 1608.

Frequency Partition Sampling

As shown by the sampling techniques of FIGS. 14–16, having complete frequency statistics on relation $R_2$ can be advantageous. Complete frequency statistics on relation $R_2$, however, may not be available. Because the availability of a histogram having frequency statistics on high frequency values in relation $R_2$ may be reasonably assumed and because a significant source of inefficiency in computing a full join of two relations is the presence of join attribute values having a relatively high frequency, as the size of the join becomes large because of the high frequency values, database server 620 may perform a frequency partition sampling technique over joins by computing a full join of the tuples having low frequency join attribute values in relations $R_1$ and $R_2$ and obtaining a sample from this join, as in the join sampling technique of FIG. 2, and by using frequency statistics on high frequency join attribute values in relation $R_2$ to obtain a sample of the join of tuples having high frequency join attribute values in relations $R_1$ and $R_2$, as in the join sampling techniques of FIGS. 14, 15, and 16.

The join attribute values need not be of high frequency simultaneously in both relations $R_1$ and $R_2$. Rather, the join attribute values which have a high frequency in relation $R_2$ may be used as a suitable approximation to the set of join attribute values which create a large number of tuples in the join.

Figure 17:
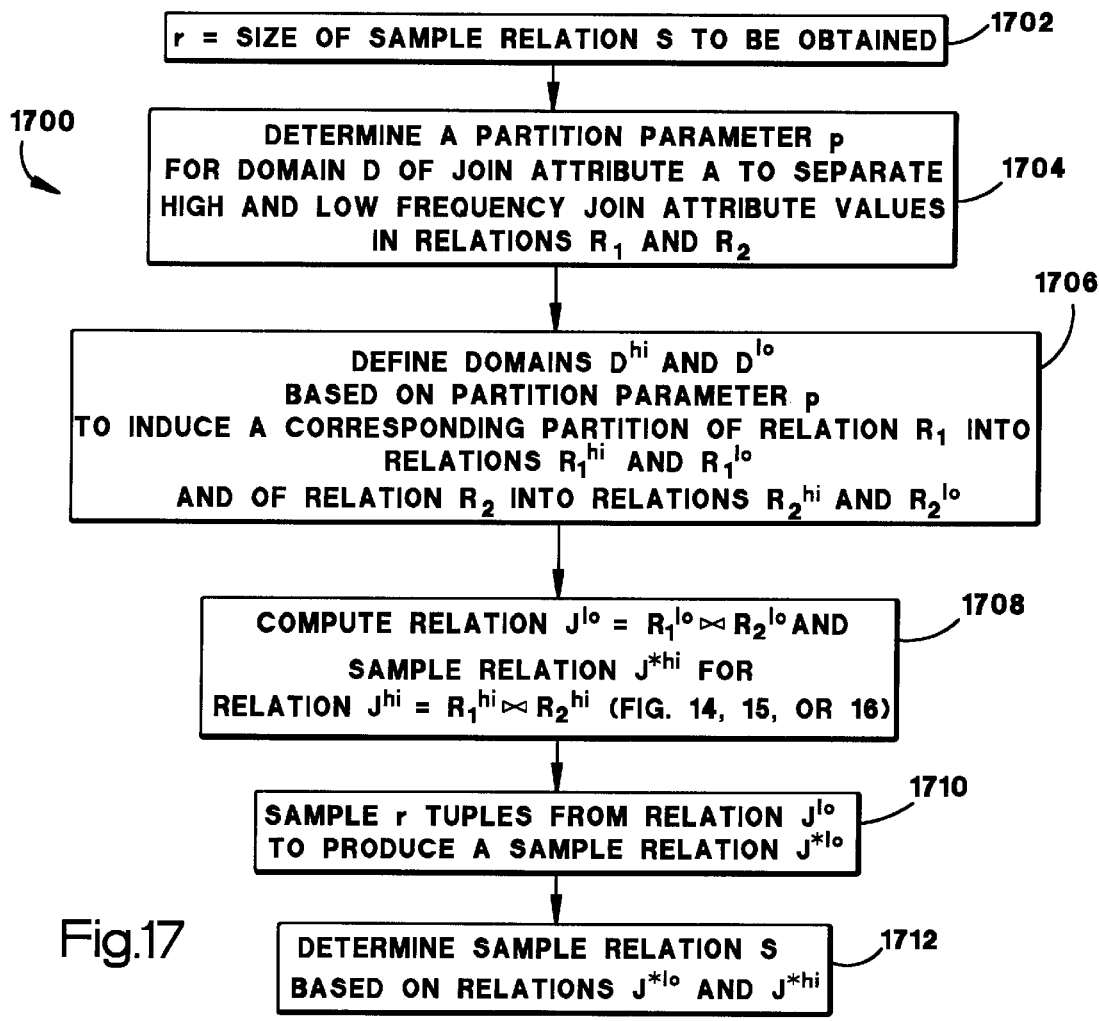
FIG. 17 illustrates a flow diagram for one example of a frequency partition sampling technique over join operations.

Database server 620 for one example may perform a frequency partition sampling technique over joins in accordance with a flow diagram 1700 of FIG. 17.

For step 1702 of FIG. 17, a variable r is initialized to the size of sample relation S to be obtained from the join of relations $R_1$ and $R_2$. For step 1704, a partition parameter p is determined for domain D of join attribute A to separate high frequency join attribute values from low frequency join attribute values in relations $R_1$ and $R_2$. Partition parameter p may be determined in any suitable manner. As one example, partition parameter p may be determined based on a suitable threshold percentage of the number of tuples of relation $R_2$, such as 2%, or $p=0.02*n_2$, for example. The suitability of a particular partition parameter p may depend, for example, on the data distribution skew of the join attribute values in relation $R_2$. A suitable partition parameter for a given pair of relations $R_1$ and $R_2$ may be determined experimentally, for example, by using different partition parameters for the join sampling technique of FIG. 17 and comparing the resulting samples with a sample produced from the join sampling technique of FIG. 2.

For step 1706, domains $D^{hi}$ and $D^{lo}$ are defined based on parameter p. The domain $D^{hi}$ may be defined as the set of values in domain D having a frequency greater than or equal to partition parameter p in relation $R_2$, and the domain $D^{lo}$ may be defined as the remaining values in domain D, that is those values in domain D having a frequency less than parameter p in relation $R_2$. Domains $D^{hi}$ arid $D^{lo}$ are used to induce a corresponding partition of relation $R_1$ into relations $R_1^{hi}=R_1|_{D^{hi}}$ and $R_1^{lo}=R_1|_{D^{lo}}$ and of relation $R_2$ into relations $R_2^{hi}=R_2|_{D^{hi}}$ and $R_2^{lo}=R_2|_{D^{lo}}$, where $R|_D$ denotes the selection of tuples from relation R with a join attribute value in domain D.

For step 1708, a relation $j^{lo}$ is computed as the join $j^{lo}=R_1^{lo}\infty R_2^{lo}$, and a sample relation $J^{*hi}$ is computed as a sample of the join $J^{hi}=R_1^{hi}\infty R_2$ using the sampling semantics as designated by a join sample operator or as predetermined by database server 620. Sample relation $J^{*hi}$ may be computed, for example, in accordance with the stream sampling technique of FIG. 14, the group sampling technique of FIG. 15, or the count sampling technique of FIG. 16.

For step 1710, a suitable number, such as the sample size r for example, of tuples from relation $j^{lo}$ are sampled to produce a sample relation $J^{*lo}$. Sample relation $J^{*lo}$ may be obtained from relation $j^{lo}$ using any suitable sampling technique such as the sampling technique of FIG. 7 or 8, for example. The computation of the join $J^{lo}=R_1^{lo}\infty R_2^{lo}$ for step 1708 and the sampling of relation $J^{lo}$ for step 1710 generally corresponds to the join sampling technique of FIG. 2.

A sample relation S of the join $J=R_1\infty R_2$ is then determined for step 1712 based on sample relations $J^{*lo}$ and $J^{*hi}$. Sample relation S may be determined in any suitable manner based on sample relations $J^{*lo}$ and $J^{*hi}$. As one example, sample relation S may be determined by sampling a number of tuples from each sample relation $J^{*lo}$ and $J^{*hi}$ in proportion to the relative size of the join in each domain $D^{lo}$ and $D^{hi}$, respectively. Obtaining sample relation S in this manner may be facilitated by sampling the same number r of tuples for each sample relation $J^{*lo}$ and $J^{*hi}$.

Figure 18:
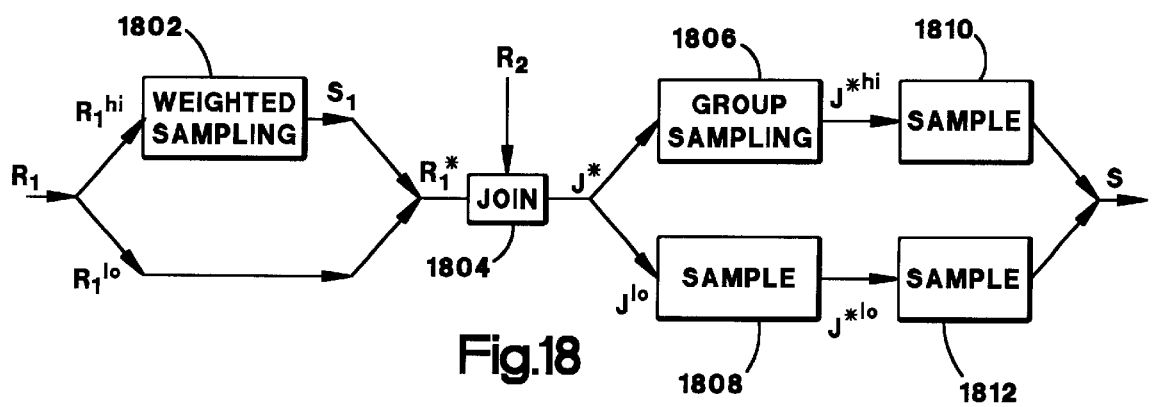
FIG. 18 illustrates a block diagram for one example of the frequency partition sequential sampling technique of FIG. 17.

Database server 620 for one example may perform the frequency partition sampling technique of FIG. 17 in accordance with the block diagram of FIG. 18.

As illustrated in FIG. 18, relation $R_1$ is received as a stream and, for steps 1704 and 1706 of FIG. 17, is partitioned into relations $R_1^{hi}$ and $R_1^{lo}$ by evaluating each tuple of relation $R_1$ as it is received and directing the tuple either through a weighted sampling tool 1802 if the tuple has a join attribute value that exceeds parameter p or past weighted sampling tool 1802 if the tuple has a join attribute value that does not exceed parameter p. As the tuples of relation $R_1^{hi}$ stream by, frequency statistics on the join attribute values of relation $R_1^{hi}$ may be collected and combined with the frequency statistics on the join attribute values of relation $R_2^{hi}$ to determine the net size $n_{hi}$ of the join $J^{hi}=R_1^{hi}\infty R_2^{hi}$.

For step 1708, weighted sampling tool 1802 uses frequency statistics on the join attribute values of relation $R_2^{hi}$ as weights to obtain a sample relation $S_1$ of r tuples from relation $R_1^{hi}$. Weighted sampling tool 1802 may perform any suitable sequential sampling technique such as that of FIG. 9 or 10, for example, for WR semantics. The tuples of sample relation $S_1$ are merged back into the stream with the tuples of relation $R_1^{lo}$, and the resulting merged output stream is denoted as a relation $R_1^* = S_1 \cup R_1^{lo}$. The tuples of relation $R_1^*$ are directed through a join tool 1804 with the tuples of relation $R_2$ to compute a relation $J^*$ as the join $J^* = R_1 \infty R_2$. As the tuples of relation $J^*$ are output, the number $n_{lo}$ of tuples in relation $J^*$ that contain $D^{lo}$ values, that is the number $n_{lo}$ of tuples in the join $J^{lo} = R_1^{lo} \infty R_2^{lo}$, may be determined.

Relation $J^*$ is then partitioned with the tuples having high frequency join attribute values directed through a group sampling tool 1806 where one random tuple is sampled from each of the r groups corresponding to the r tuples of sample relation $S_1$ to produce sample relation $J^{*hi}$. Weighted sampling tool 1802, join tool 1804, and group sampling tool 1806 thus compute sample relation $J^{*hi}$ as a sample of the join $J^{hi} = R_1^{hi} \infty R_2^{hi}$ using WR sampling semantics in accordance with the group sampling technique of FIG. 15.

The tuples of relation $J^*$ having low frequency join attribute values, that is the tuples of relation $J^{lo}$, are directed through a sampling tool 1808 where r tuples from relation $J^{lo}$ are sampled to produce sample relation $J^{*lo}$ for step 1710. Sampling tool 1808 may perform any suitable sampling technique, such as the sampling technique of FIG. 7 or 8 for example. Join tool 1804 and sampling tool 1808 thus compute sample relation $J^{*lo}$ as a sample of the join $J^{lo} = R_1^{lo} \infty R_2^{lo}$ generally in accordance with the join sampling technique of FIG. 2.

For step 1712, a number of tuples to be sampled from each sample relation $J^{*hi}$ and $J^{*lo}$ is determined using a coin flip technique where r coins are flipped with heads probability proportional to $n_{hi}$ and tails probability proportional to $n_{lo}$. The number of heads is $r_h$, and the number of tails is $r_t$, noting $r = r_h + r_t$. The tuples of sample relation $J^{*hi}$ are directed through a sampling tool 1810 where $r_h$ tuples of sample relation $J^{*hi}$ are sampled, and the tuples of sample relation $J^{*lo}$ are directed through a sampling tool 1812 where $r_t$ tuples of sample relation $J^{*lo}$ are sampled. Sampling tools 1810 and 1812 may each perform any suitable sampling technique, such as an unweighted sequential WoR sampling technique for example. The sample $r_h$ tuples of sample relation $J^{*hi}$ and the sample $r_t$ tuples of sample relation $J^{*lo}$ are then combined to form sample relation S of r tuples.

The frequency partition sampling technique example of FIG. 18 requires neither an index nor complete frequency statistics on the join attribute values of relation $R_2$. Rather, a histogram having frequency statistics for the high frequency values in relation $R_2$ is used. If an index on relation $R_2^{hi}$ is available in addition to the frequency statistics on relation $R_2^{hi}$, then sample relation $J^{*hi}$ may be computed for step 1708 using the stream sampling technique of FIG. 14. Alternatively, the use of an index on relation $R_2^{hi}$ may be replaced with a scan of relation $R_2^{hi}$ by computing sample relation $J^{*hi}$ for step 1708 using the count sampling technique of FIG. 16.

Database server 620 for another example may perform the frequency partition sampling technique of FIG. 17 using CF semantics by computing sample relation $J^{*hi}$ for step 1708 using CF semantics in accordance with the group sampling technique of FIG. 15. The tuples of relation $J^{lo}$ may be sampled for step 1710 using a suitable unweighted CF sampling technique to produce sample relation $J^{*lo}$, and sample relations $j^{*hi}$ and $J^{*lo}$ may then be combined for step 1712 to produce sample relation S.

Join Sampling Implementation Examples

As examples, the sequential WR sampling techniques of FIGS. 7 and 9 may each be implemented with the Microsoft® SQL Server as an operator. Because of the object-oriented design of code in the Microsoft® SQL Server, adding each operator to a query execution tree may be done by creating a derived class of a base operator class and implementing standard methods, such as Open, Close, and GetRow for example.

The join sampling techniques of FIGS. 2, 4, 14, and 18 may be implemented with the Microsoft® SQL Server in the following exemplary manners.

For the join sampling technique of FIG. 2, an execution tree generated by the optimizer of the Microsoft® SQL Server may be modified by adding the operator for the sequential WR sampling technique of FIG. 7 as the root of the execution tree. The resulting query execution tree produces a random sample of the query.

For the join sampling technique of FIG. 4, a random sample of tuples of relation $R_1$ may be obtained by creating a uniform random sample of the key values of relation $R_1$, storing them in a temporary table $T_1$, and joining table $T_1$ with relation $R_1$ on the key value. Also, each join method in the Microsoft® SQL Server, such as the Nested Loops, Hash Join, and Merge Join for example, may be modified so that each sampled tuple from relation $R_1$ is joined with a random tuple from relation $R_2$ among all tuples in relation $R_2$ having a matching join attribute value with the sampled tuple from relation $R_1$. For the Nested Loops join method, for example, a random number k between 1 and $f(v)$ for the join attribute value v in a sampled tuple from relation $R_1$ is determined. The first $k-1$ matches for the join are skipped before considering the kth match. This kth tuple may be accepted with probability $m_2(v)/M$. The other sampled tuples from relation $R_1$ are similarly evaluated.

For the stream sampling technique of FIG. 14, the operator for the sequential WR sampling technique of FIG. 9 may be implemented as a child of the join method, that is between scan operator on relation $R_1$ and the join operator. The operator may determine the number of copies to be generated and produce that many copies for each tuple of relation $R_1$ in the GetRow method. The statistics on the join attribute values of relation $R_2$ may be read from a file and stored in a work table indexed on the join attribute values to facilitate access of the frequency of a given join attribute value. Also, the join operator may be modified so that for each tuple sampled from relation $R_1$, exactly one tuple is output at random from among all the tuples that join with relation $R_2$.

For the frequency partition sampling technique of FIG. 18, the operator for the stream sampling technique may be modified to generate the weighted random sample from only the tuples having high frequency join attribute values in relation $R_1$. The tuples of relation $R_1$ having low frequency join attribute values may pass through the operator. The statistics for high frequency join attribute values used by this operator may be read from a file and stored in a work table as for the stream sampling technique. Also, the join operator may be modified to perform the group sampling technique to produce the sample $J^{*hi}$. The operator for the sequential WR sampling technique of FIG. 9 may be added over the join operator to produce the sample $J^{*lo}$. An operator for materializing the samples $J^{*hi}$ and $J^{*lo}$ and for sampling them without replacement may be added as the root of the query tree to produce the sample of the join.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method for obtaining a sample of a join of first and second relations of records in a database system, the method comprising the steps of:
   (a) sampling records of the first relation based on the number of records having a matching join attribute value in the second relation to obtain a first sample of records; and
   (b) joining one or more records of the first sample with one or more records of the second relation.

2. The method of claim 1, wherein the sampling step (a) comprises the step of sampling each record of the first relation based on a weight specified for the record of the first relation based on the number of records having a matching join attribute value in the second relation.

3. The method of claim 1, wherein the sampling step (a) comprises the step of using frequency statistics on join attribute values of the second relation to sample records of the first relation.

4. The method of claim 1, wherein the sampling step (a) comprises the step of sampling records of the first relation using a with replacement, without replacement, or coin flip sampling technique.

5. The method of claim 1, wherein the sampling step (a) comprises the step of sampling records of the first relation in one pass using a sequential sampling technique.

6. The method of claim 5, wherein the first relation is produced as a stream of records as a result of a query.

7. The method of claim 5, wherein the first relation is a base relation materialized in a database of the database system.

8. The method of claim 1, wherein the sampling step (a) comprises the steps of:
   (i) selectively outputting a record of the first relation one or more times based on a probability; and
   (ii) repeating step (a)(i) for each record of the first relation.

9. The method of claim 1, wherein the sampling step (a) comprises the steps of:
   (i) initializing a reservoir of records,
   (ii) selectively resetting one or more records of the reservoir to be a record of the first relation based on a probability, and
   (iii) repeating step (a)(ii) for each record of the first relation.

10. The method of claim 1, wherein the joining step (b) comprises the steps of:
    (i) sampling a record from the second relation having a matching join attribute value with an identified record of ,the first sample, and
    (ii) joining the identified record of the first sample with the sampled record of the second relation.

11. The method of claim 10, wherein the joining step (b) further comprises the step of:
    (iii) repeating steps(b)(i) and (b)(ii) for each record of the first sample.

12. The method of claim 1, wherein the joining step (b) comprises the step of joining the records of the first sample with the records of the second relation to produce a relation having groups of records with each group corresponding to a respective one of the records of the first sample; and
    wherein the method further comprises the step of:
    (c) sampling one record from each group.

13. The method of claim 1, wherein the joining step (b) comprises the steps of:
    (i) sampling records from the second relation to obtain a second sample of records such that the number of records in the first sample with any one join attribute value is the same as that in the second sample, and
    (ii) joining the records of the first sample with the records of the second sample.

14. The method of claim 13, wherein the joining step (b)(ii) comprises the steps of:
    (A) sampling a record without replacement from the first sample having a matching join attribute value with an identified record of the second sample,
    (B) joining the sampled record of the first sample with the identified record of the second sample, and
    (C) repeating steps (b)(ii)(A) and (b)(ii)(B) for each record of the second sample.

15. The method of claim 1, wherein the sampling step (a) comprises the step of sampling records of the first relation having a matching join attribute value with at least a predetermined number of records in the second relation;
    wherein the joining step (b) comprises the step of joining the records of the first sample with the records of the second relation; and
    wherein the method further comprises the step of:
    (c) joining records of the first relation having a matching join attribute value with less than the predetermined number of records in the second relation with the records of the second relation.

16. A computer readable medium having computer-executable instructions for obtaining a sample of a join of first and second relations of records, the computer-executable instructions for performing the steps of:
    (a) sampling records of the first relation based on the number of records having a matching join attribute value in the second relation to obtain a first sample of records; and
    (b) joining one or more records of the first sample with one or more records of the second relation.

17. The computer readable medium of claim 16, wherein the sampling step (a) comprises the step of sampling each record of the first relation based on a weight specified for the record of the first relation based on the number of records having a matching join attribute value in the second relation.

18. The computer readable medium of claim 16, wherein the sampling step (a) comprises the step of using frequency statistics on join attribute values of the second relation to sample records of the first relation.

19. The computer readable medium of claim 16, wherein the sampling step (a) comprises the step of sampling records of the first relation using a with replacement, without replacement, or coin flip sampling technique.

20. The computer readable medium of claim 16, wherein the sampling step (a) comprises the step of sampling records of the first relation in one pass using a sequential sampling technique.

21. The computer readable medium of claim 20, wherein the first relation is produced as a stream of records as a result of a query.

22. The computer readable medium of claim 20, wherein the first relation is a base relation materialized in a database.

23. The computer readable medium of claim 16, wherein the sampling step (a) comprises the steps of:
   (i) selectively outputting a record of the first relation one or more times based on a probability; and
   (ii) repeating step (a)(i) for each record of the first relation.

24. The computer readable medium of claim 16, wherein the sampling step (a) comprises the steps of:
   (i) initializing a reservoir of records,
   (ii) selectively resetting one or more records of the reservoir to be a record of the first relation based on a probability, and
   (iii) repeating step (a)(ii) for each record of the first relation.

25. The computer readable medium of claim 16, wherein the joining step (b) comprises the steps of:
   (i) sampling a record from the second relation having a matching join attribute value with an identified record of the first sample, and
   (ii) joining the identified record of the first sample with the sampled record of the second relation.

26. The computer readable medium of claim 25, wherein the joining step (b) further comprises the step of:
   (iii) repeating steps (b)(i) and (b)(ii) for each record of the first sample.

27. The computer readable medium of claim 16, wherein the joining step (b) comprises the step of joining the records of the first sample with the records of the second relation to produce a relation having groups of records with each group corresponding to a respective one of the records of the first sample; and
   wherein the computer readable medium comprises further computer-executable instructions for performing the step of:
   (c) sampling one record from each group.

28. The computer readable medium of claim 16, wherein the joining step (b) comprises the steps of:
   (i) sampling records from the second relation to obtain a second sample of records such that the number of records in the first sample with any one join attribute value is the same as that in the second sample, and
   (ii) joining the records of the first sample with the records of the second sample.

29. The computer readable medium of claim 28, wherein the joining step (b)(ii) comprises the steps of:
   (A) sampling a record without replacement from the first sample having a matching join attribute value with an identified record of the second sample,
   (B) joining the sampled record of the first sample with the identified record of the second sample, and
   (C) repeating steps (b)(ii)(A) and (b)(ii)(B) for each record of the second sample.

30. The computer readable medium of claim 16, wherein the sampling step (a) comprises the step of sampling records of the first relation having a matching join attribute value with at least a predetermined number of records in the second relation;
   wherein the joining step (b) comprises the step of joining the records of the first sample with the records of the second relation; and
   wherein the computer readable medium comprises further computer-executable instructions for performing the step of:
   (c) joining records of the first relation having a matching join attribute value with less than the predetermined number of records in the second relation with the records of the second relation.

31. A database system for obtaining a sample of a join of first and second relations of records in the database system, the database system comprising:
   (a) sampling means for sampling records of the first relation based on the number of records having a matching join attribute value in the second relation to obtain a first sample of records; and
   (b) join means for joining one or more records of the first sample with one or more records of the second relation.

32. The database system of claim 31, wherein the sampling means comprises means for sampling each record of the first relation based on a weight specified for the record of the first relation based on the number of records having a matching join attribute value in the second relation.

33. The database system of claim 31, wherein the sampling means comprises means for using frequency statistics on join attribute values of the second relation to sample records of the first relation.

34. The database system of claim 31, wherein the sampling means comprises means for sampling records of the first relation using a with replacement, without replacement, or coin flip sampling technique.

35. The database system of claim 31, wherein the sampling means comprises means for sampling records of the first relation in one pass using a sequential sampling technique.

36. The database system of claim 35, wherein the first relation is produced as a stream of records as a result of a query.

37. The database system of claim 35, wherein the first relation is a base relation materialized in a database of the database system.

38. The database system of claim 31, wherein the sampling means comprises means for selectively outputting a record of the first relation one or more times based on a probability.

39. The database system of claim 31, wherein the sampling means comprises:
   (i) means for initializing a reservoir of records, and
   (ii) means for selectively resetting one or more records of the reservoir to be a record of the first relation based on a probability.

40. The database system of claim 31, wherein the join means comprises:
   (i) means for sampling a record from the second relation having a matching join attribute value with an identified record of the first sample, and
   (ii) means for joining the identified record of the first sample with the sampled record of the second relation.

41. The database system of claim 31, wherein the join means comprises means for joining the records of the first sample with the records of the second relation to produce a relation having groups of records with each group corresponding to a respective one of the records of the first sample; and
   wherein the database system comprises:
   (c) means for sampling one record from each group.

42. The database system of claim 31, wherein the join means comprises:

(i) means for sampling records from the second relation to obtain a second sample of records such that the number of records in the first sample with any one join attribute value is the same as that in the second sample, and (ii) means for joining the records of the first sample with the records of the second sample.

43. The database system of claim 31, wherein the sampling means comprises means for sampling records of the first relation having a matching join attribute value with at least a predetermined number of records in the second relation; and wherein the join means comprises means for joining the records of the first sample with the records of the second relation and means for joining records of the first relation having a matching join attribute value with less than the predetermined number of records in the second relation with the records of the second relation.

* * * * *